United States Patent

Takabayashi et al.

(10) Patent No.: US 6,882,760 B2
(45) Date of Patent: Apr. 19, 2005

(54) POLARIZATION DISPERSION COMPENSATING APPARATUS

(75) Inventors: Masakazu Takabayashi, Tokyo (JP); Sadayuki Matsumoto, Tokyo (JP); Takuya Ohira, Tokyo (JP); Kiichi Yoshiara, Tokyo (JP); Junichiro Hoshizaki, Tokyo (JP); Hajime Takeya, Tokyo (JP); Shigeru Matsuno, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 38 days.

(21) Appl. No.: 10/362,760

(22) PCT Filed: Jun. 29, 2001

(86) PCT No.: PCT/JP01/05635

§ 371 (c)(1),
(2), (4) Date: Feb. 26, 2003

(87) PCT Pub. No.: WO03/003104

PCT Pub. Date: Jan. 9, 2003

(65) Prior Publication Data

US 2004/0101227 A1 May 27, 2004

(51) Int. Cl.⁷ .......................... G02B 6/12; H04B 10/18; G02F 1/01
(52) U.S. Cl. ........................... 385/11; 398/81; 398/147; 398/149; 359/499; 359/497
(58) Field of Search .................... 385/2, 3, 8, 9, 385/11, 27, 30, 40, 41, 49; 398/81, 147, 149; 359/494–499

(56) References Cited

U.S. PATENT DOCUMENTS 5,930,414 A     7/1999 Fishman et al.
6,271,952 B1    8/2001 Epworth
6,538,787 B1 *  3/2003 Moeller et al. ............... 385/11
6,748,142 B1 *  6/2004 Madsen ....................... 385/49
6,801,721 B1 * 10/2004 Madsen ...................... 398/147
2003/0021514 A1 * 1/2003 Ito et al. ..................... 385/11

FOREIGN PATENT DOCUMENTS

JP       6-51145           2/1994
JP       2001-21848        1/2001
JP       2001-42272        2/2001
JP       200142272 A  *    2/2001

OTHER PUBLICATIONS

Aslund, M. et al.; "Tuning of integrated optical component using UV–induced negative index change", *Electron. Lett.*, vol. 35, No. 3, pp. 236–237, (Feb. 4, 1999).
Kudou, T. et al.; "Theoretical Basis of Polarization Mode Dispersion Equalization up to the Second Order", *J. of Lightwave Tech.*, vol. 18, No. 4, pp. 614–617, (Apr. 4, 2000).

* cited by examiner

*Primary Examiner*—Rodney Bovernick
*Assistant Examiner*—Omar Rojas
(74) *Attorney, Agent, or Firm*—Leydig, Voit & Mayer, Ltd.

(57) ABSTRACT

A polarization dispersion compensation apparatus includes a polarization controller, a polarization beam splitter, an optical delay circuit, and a polarization beam combiner. The polarization controller controls polarization of an optical signal so that the polarization axis of the input optical signal substantially coincides with the optical axis of an optical transmission line, and the polarization beam splitter section splits the optical signal into two polarized components perpendicular to each other. The optical delay circuit section causes a difference in delay between the two polarized components, and the polarization beam combiner section combines the two polarized components output from the optical delay circuit section. Each of the polarization beam splitter section and the polarization beam combiner section includes a symmetric Mach-Zehnder interferometer having optical transmission lines in two arms, each arm including a temperature control and a birefringence portion for compensating polarization dispersion between the two polarized components.

10 Claims, 20 Drawing Sheets

US 6,882,760 B2

POLARIZATION DISPERSION COMPENSATING APPARATUS

TECHNICAL FIELD

The present invention relates to a polarization dispersion compensation apparatus for compensating polarization dispersion, which may become a factor in restricting transmission rate or transmission distance in an optical fiber cable for use in a superfast optical communications system.

BACKGROUND ART

In the optical fiber cable for use in a superfast optical communications system operating at 40 Gbps or more, comparatively large polarization dispersion occurs, and this becomes a factor for restricting transmission rate or transmission distance. This polarization dispersion occurs as follows. As shown in FIG. 23, degeneration of the base mode occurs due to decentering of a core of an optical fiber cable 100 and application of a non-axisymmetric stress to the core. A group delay difference occurs between a TE wave and a TM wave depending on a difference in the propagation velocity between the optical signals of the two polarized components of the TE wave and the TM wave, which are perpendicular to each other. As a result, broadening occurs in the temporal direction in an optical pulse signal, restricting transmission rate and transmission distance in the communication system. In order to solve the above-mentioned problems, it is required to compensate polarization so that no group delay difference occurs between the two polarized components by controlling the polarization state in the reception terminal station and generating a group delay difference inverse to the group delay difference that occurs in the optical fiber cable.

FIG. 24 is a perspective view showing polarization compensation with a polarization-maintaining optical fiber cable 101 of prior art, and FIG. 25 is a longitudinal sectional view showing a construction of the polarization-maintaining optical fiber cable 101 of FIG. 24.

The prior art example shown in FIG. 24 compensates for the polarization dispersion using the polarization-maintaining optical fiber cable 101. As shown in FIG. 25, this polarization-maintaining optical fiber cable 101 has a predetermined birefringence with a non-axisymmetric stress applied to a core 102 by inserting silica glasses 104 and 105 doped with $Ba_2O_3$ on both sides of the core 102 in the portion of a cladding 103 around the core 102. In this polarization-maintaining optical fiber cable 101, the propagation velocities of the polarized components perpendicular to each other are different from each other. Therefore, to the polarization dispersion of the optical fiber cable can be compensated on this basis. In practice, to match the polarization axis of incident light to the polarization axis of the polarization-maintaining optical fiber cable 101, it is required to provide a polarization controller including a half-wavelength plate and a quarter-wavelength plate at the preceding stage of the polarization-maintaining optical fiber cable 101.

FIG. 26 is a plan view showing a construction of the polarization dispersion compensation apparatus disclosed in FIG. 3 of a first prior art document, "Teruhiko Kudou et al., Theoretical Basis of Polarization Mode Dispersion Equalization up to the Second Order, Journal of Lightwave Technology, Vol. 18, No. 4, pp. 614–617, April 2000". As described above, the polarization dispersion changes depending on environmental changes in the optical fiber cable, and accordingly, there is needed a polarization dispersion compensator capable of adjusting a polarization dispersion value.

In the prior art example of FIG. 26, a polarization beam splitter 111 is provided at the final stage of an optical transmission line 110 for propagating an inputted optical signal, and this is followed by a construction provided with two variable phase shifters PS1 and PS2, a directional coupler DC101, two variable phase shifters PS3 and PS4 and two variable optical delay circuits 113 and 114 as well as a polarization beam combiner 112 further provided at the final stage of the polarization dispersion compensation apparatus. In the polarization dispersion compensation apparatus of this prior art, compensation is made for the polarization dispersion by varying the polarization dispersion by means of an optical processing circuit. However, this prior art example has had the problem that the size of the apparatus has been comparatively large and the transmission loss has been increased due to the use of the bulk type polarization beam splitter and the polarization beam combiner.

FIG. 27 is a plan view showing a construction of the polarization dispersion compensation apparatus disclosed in the specification of U.S. Pat. No. 5,930,414, which is a second prior art document.

The prior art of FIG. 27 is provided with a polarization controller 120 constituted by including a quarter-wavelength plate 121 and a half-wavelength plate 122 provided at the first stage, a polarization beam splitter 123 for splitting an inputted optical signal into two polarized components at the next stage and a polarization beam combiner 124 for combining these two polarized components at the final stage. Moreover, in order to cause a variable delay time between the two polarized components, a plurality of asymmetrical Mach-Zehnder interferometers 130 to 132, which are constituted by including optical waveguides and connected in concatenation, are provided between the polarization beam splitter 123 and the polarization beam combiner 124 via directional couplers 141 to 143, which have adjustable coupling coefficients. Further, it is required to switch the relative optical phase in the Mach-Zehnder interferometers 130 to 132 with respect to the structural common-mode interference of the two optical signals, which are outputted from two arm portions of the Mach-Zehnder interferometers 130 to 132 and thereafter inputted to the directional couplers 141 to 143 at the subsequent stages. For the above reasons, the Mach-Zehnder interferometers 130 to 132 are provided with variable phase shifters 150 to 152, respectively. Therefore, in this prior art example, compensation is made for the polarization dispersion by combining the directional couplers 140 to 143 with an optical processing circuit that has a Mach-Zehnder structure. However, even this prior art example has had the problem that the size of the apparatus had become comparatively large. Therefore, the polarization dispersion compensator is required to have a lower loss and a small size as well as a high operating speed and a low consumption of power.

FIG. 28 is a plan view showing a construction of the polarization dispersion compensation apparatus disclosed in a third prior art document, "Japanese Patent Laid-Open Publication No. 2001-42272".

In the prior art of FIG. 28, an input channel optical waveguide 211, an optical waveguide type polarization beam splitter element 212, a pair of optical waveguides 213a and 213b, a variable branching ratio optical coupler 214, a pair of optical delay lines 215a and 215b, an optical waveguide type polarization beam combiner element 216 and an output channel optical waveguide 217a are successively formed on a silicon substrate 210. Further, polarization change means 218a and 218b are formed in either one of a pair of optical waveguides 213a and 213b and in either one of a pair of optical delay lines 215a and 215b. Moreover, phase adjustment means 219a and 219b for adjusting the relative phase difference are formed in a pair of optical waveguides 213a and 213b. In this case, one input port of the optical waveguide type polarization beam splitter element 212 is optically connected with the input channel optical waveguide 211, while two input ports of the variable branching ratio optical coupler 214 are optically connected with the two output ports of the optical waveguide type polarization beam splitter element 212 via a pair of optical waveguides 213a and 213b. Moreover, a pair of optical delay lines 215a and 215b has one end optically connected with two output ports of the variable branching ratio optical coupler 214 and the other end optically connected with two input ports of the optical waveguide type polarization beam combiner element 216. One output port of the optical waveguide type polarization beam combiner element 216 is optically connected with the output channel optical waveguide 217a.

In the polarization dispersion compensation apparatus constituted as above, the phase adjustment means 219a and 219b and the variable branching ratio optical coupler 214 operate as a polarization controller 300, and the optical delay lines 215a and 215b operate as a variable delay line, constituting the polarization dispersion compensation circuit as a whole. With this arrangement, this polarization dispersion compensation circuit can compensate for the primary polarization dispersion in the optical transmission line.

In this polarization dispersion compensation apparatus, the polarization controller 300 exists between the polarization beam splitter element 212 and the optical delay lines 215a and 215b. An optical signal inputted to the polarization beam splitter element 212 is split into the TE wave and the TM wave. Subsequently, the optical signal has a polarization controlled by the polarization controller 300 constituted by including the phase adjustment means 219a and the variable branching ratio coupler 214, and thereafter, the controlled optical signal is inputted to a pair of optical delay lines 215a and 215b. The amount of delay of the optical signal is adjusted by the optical delay lines 215a and 215b, and the polarization dispersion of the optical signal is compensated. However, in this polarization dispersion compensation apparatus control of compensator of the polarization dispersion is very difficult since it is required to adjust the three points of the phase adjustment means 219a and 219b, the variable branching ratio optical coupler 214, and the optical delay lines 215a and 215b.

It is an object of the present to solve the aforementioned problems and provide a polarization dispersion compensation apparatus, which has a smaller size and a lighter weight than the prior art, and is able to compensate for the polarization dispersion with lower loss.

Another object of the present invention is to solve the aforementioned problems and provide a polarization dispersion compensation apparatus, which is able to control compensation for a polarization dispersion more easily than in the prior art.

DISCLOSURE OF THE INVENTION

According to one aspect of the present invention, there is provided a polarization dispersion compensation apparatus including:

polarization control means for controlling a polarization state of an inputted optical signal so that a polarization axis of the optical signal substantially coincides with an optical axis of an optical transmission line;

polarization beam splitter means for splitting an optical signal outputted from the polarization control means, and outputting optical signals of two polarized components perpendicular to each other;

optical delay means including two optical transmission lines of lengths different from each other, and causing a difference in delay between the two polarized components of the optical signal outputted from the polarization beam splitter means; and polarization beam combiner means for combining the two polarized components of the optical signal outputted from the optical delay means, and outputting a combined optical signal, wherein the polarization beam splitter means includes a symmetric Mach-Zehnder interferometer having optical transmission lines of first and second arm portions, and at least one of the first and second arm portions includes first refractive index control means for controlling a refractive index of the optical signal propagating through the optical transmission line of the arm portion and first birefringence means for causing birefringence in the optical signal propagating through the optical transmission line of the arm portion, wherein the polarization beam combiner means includes a symmetric Mach-Zehnder interferometer having optical transmission lines of third and fourth arm portions, and at least one of the third and fourth arm portions includes second refractive index control means for controlling a refractive index of the optical signal propagating through the optical transmission line of the arm portion and second birefringence means for causing birefringence in the optical signal propagating through the optical transmission line of the arm portion.

In the above-mentioned polarization compensation apparatus, the polarization beam splitter means includes:

a first directional coupler for distributing the inputted optical signal into two optical signals, and outputting the distributed two optical signals;

the optical transmission line of the first arm portion for propagating one optical signal out of the two optical signals distributed by the first directional coupler;

the optical transmission line of the second arm portion for propagating the other optical signal out of the two optical signals distributed by the first directional coupler; and a second directional coupler for combining the optical signal propagating through the optical transmission line of the first arm portion with the optical signal propagating through the optical transmission line of the second arm portion and for thereafter distributing a resulting combined optical signal into two optical signals, and outputting the distributed two optical signals, and wherein the polarization beam combiner means includes:

a third directional coupler for combining the inputted two optical signals, and for thereafter distributing a resulting combined optical signal into two optical signals, and outputting the distributed two optical signals;

the optical transmission line of the third arm portion for propagating one optical signal out of the two optical signals distributed by the third directional coupler;

the optical transmission line of the fourth arm portion for propagating the other optical signal out of the two optical signals distributed by the third directional coupler; and a fourth directional coupler for combining the optical signal propagating through the optical transmission line of the third arm portion with the optical signal propagating through the optical transmission line of the fourth arm portion and for thereafter outputting a resulting combined optical signal.

Also, in the above-mentioned polarization dispersion compensation apparatus, the first refractive index control means controls a temperature of the optical transmission line of the arm portion provided with the first refractive index control means, so as to control the refractive index of the optical signal propagating through the optical transmission line of the arm portion, and wherein the second refractive index control means controls a temperature of the optical transmission line of the arm portion provided with the second refractive index control means, so as to control the refractive index of the optical signal propagating through the optical transmission line of the arm portion.

Further, in the above-mentioned polarization dispersion compensation apparatus, the first refractive index control means controls an electric field applied to the optical transmission line of the arm portion which is subjected to a predetermined polling process and which is provided with the first refractive index control means, so as to control the refractive index of the optical signal propagating through the optical transmission line of the arm portion, and wherein the second refractive index control means controls an electric field applied to the optical transmission line of the arm portion which is subjected to a predetermined polling process and which is provided with the second refractive index control means, so as to control the refractive index of the optical signal propagating through the optical transmission line of the arm portion.

Furthermore, in the above-mentioned polarization dispersion compensation apparatus, the first birefringence means irradiates the optical transmission line of the arm portion provided with the first birefringence means with ultraviolet rays, so as to cause birefringence in the optical signal propagating through the optical transmission line of the arm portion, and wherein the second birefringence means irradiates the optical transmission line of the arm portion provided with the second birefringence means with ultraviolet rays, so as to cause birefringence in the optical signal propagating through the optical transmission line of the arm portion.

Also, the above-mentioned polarization dispersion compensation apparatus further includes third refractive index control means for controlling a temperature of one optical transmission line out of the two optical transmission lines of the optical delay means, so as to control the refractive index of the optical signal propagating through the one optical transmission line.

Further, in the above-mentioned polarization dispersion compensation apparatus, one optical transmission line out of the two optical transmission lines of the optical delay means is subjected to a predetermined polling process, and wherein the polarization dispersion compensation apparatus further includes fourth refractive index control means controls an electric field applied to the one optical transmission line subjected to the polling process, so as to control the refractive index of the optical signal propagating through the one optical transmission line.

Also, in the above-mentioned polarization dispersion compensation apparatus, the optical transmission line is an optical waveguide formed on a substrate.

Further, in the above-mentioned polarization dispersion compensation apparatus, the optical transmission line is an optical fiber cable.

Also, according to another aspect of the present invention, there is provided a polarization dispersion compensation apparatus including:

polarization control means for controlling a polarization state of an inputted optical signal so that a polarization axis of the optical signal substantially coincides with an optical axis of an optical transmission line;

polarization beam splitter means for splitting an optical signal outputted from the polarization control means, and outputting optical signals of two polarized components perpendicular to each other;

optical delay means including two optical transmission lines of lengths different from each other, and causing a difference in delay between the two polarized components of the optical signal outputted from the polarization beam splitter means; and polarization beam combiner means for combining the two polarized components of an optical signal outputted from the optical delay means, and outputting a resulting combined optical signal, wherein the polarization beam splitter means includes a fifth directional coupler having mutually adjacent two optical transmission lines, distributing the inputted optical signal into two optical signals, and outputting the distributed two optical signals, wherein the mutually adjacent two optical transmission lines of the fifth directional coupler includes fourth refractive index control means for controlling a refractive index of optical signals propagating through the two optical transmission lines and third birefringence means for causing birefringence in the optical signals propagating through the two optical transmission lines, wherein the polarization beam combiner means includes a sixth directional coupler having mutually adjacent two optical transmission lines, distributing the inputted optical signal into two optical signals, and outputting the distributed two optical signals, and wherein the mutually adjacent two optical transmission lines of the sixth directional coupler includes fifth refractive index control means for controlling a refractive index of optical signals propagating through the two optical transmission lines and fourth birefringence means for causing birefringence in the optical signals propagating through the two optical transmission lines.

Further, according to a further aspect of the present invention, there is provided a polarization dispersion compensation apparatus including:

polarization beam splitter means for splitting and outputting optical signals of two polarized components perpendicular to each other;

polarization control means including phase adjustment means and a variable branching ratio coupler and controlling a polarization state of the optical signal;

a pair of optical delay means for delaying the optical signal after the polarization beam splitting; and polarization beam combiner means having first and second output ports, combining the two polarized components of the optical signal outputted from the optical delay means, and outputting a resulting combined optical signal through the first output port, wherein the polarization beam splitter means and the polarization beam combiner means is of a symmetric Mach- Zehnder interferometer having birefringence at least in one arm portion, and wherein the phase adjustment means and the variable branching ratio coupler is controlled so that a level of a signal outputted from the first output port of the polarization beam combiner means becomes the maximum or so that a level of a signal outputted from the second output port of the polarization beam combiner means becomes the minimum.

BEST MODE FOR CARRYING OUT THE INVENTION

Figure 1:
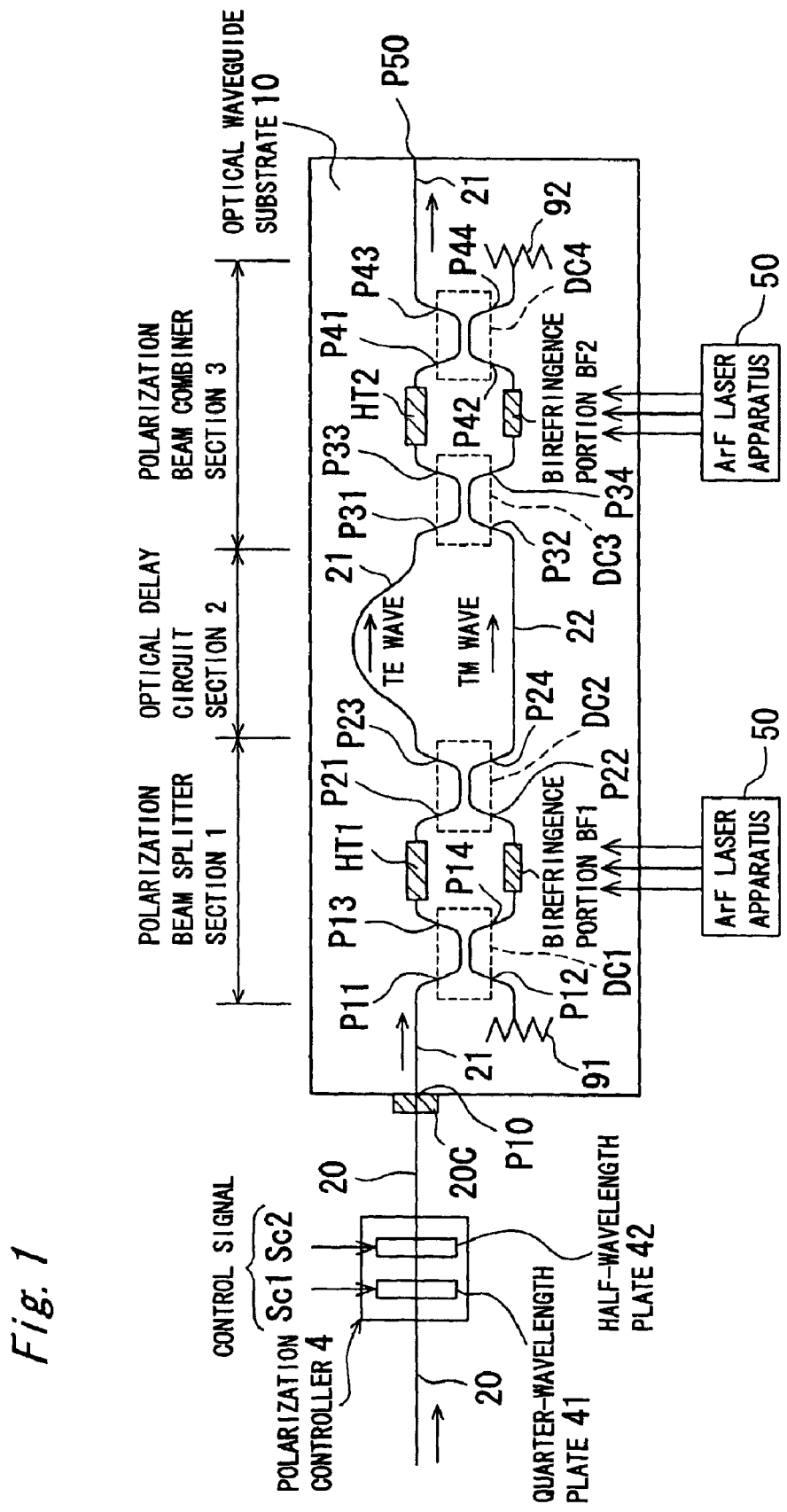
FIG. 1 is a plan view showing a construction of an optical waveguide type polarization dispersion compensation apparatus according to a first preferred embodiment of the present invention.

Preferred embodiments of the present invention will be described below with reference to the accompanying drawings. Components similar to those shown in the following figures are denoted by the same reference numerals.

First Preferred Embodiment

FIG. 1 is a plan view showing a construction of an optical waveguide type polarization dispersion compensation apparatus according to the first preferred embodiment of the present invention. The polarization dispersion compensation apparatus of this preferred embodiment is constituted by including a polarization controller 4, a polarization beam splitter section 1, an optical delay circuit section 2 and a polarization beam combiner section 3, which are cascaded. Each of the polarization beam splitter section 1 and the polarization beam combiner section 3 has a symmetric Mach-Zehnder interferometer having two arm portions. In the polarization beam splitter section 1, one arm portion out of the two arm portions is provided with a temperature control portion HT1 for controlling the refractive index of the optical signal that propagates through its optical waveguide 21, and the other arm portion is provided with a birefringence portion BF1 for causing birefringence in the optical signal that propagates through its optical waveguide 22. In the polarization beam combiner section 3, one arm portion out of the two arm portions is provided with a temperature control portion HT2 for controlling the refractive index of the optical signal that propagates through its optical waveguide 21, and the other arm portion is provided with a birefringence portion BF2 for causing birefringence in the optical signal that propagates through its optical waveguide 22.

Referring to FIG. 1, an optical fiber cable 20 for propagating the inputted optical signal is provided with the polarization controller 4 which has been known to those skilled in the art, and this polarization controller 4 is provided with a quarter-wavelength plate 41 and a half-wavelength plate 42. By adjusting the levels of a control signal Sc1 applied to the quarter-wavelength plate 41 and a control signal Sc2 applied to the half-wavelength plate 42, the polarization rotation angle of the optical signals that propagate through the wavelength plates 41 and 42 is adjusted, and this leads to that the polarization state of the optical signals is controlled so that the polarization axis of the optical signal that propagates through the optical fiber cable 20 substantially coincides with the optical axis of the optical waveguide 21 formed on an optical waveguide substrate 10. Then, the terminal portion of the optical fiber cable 20 is connected with the optical waveguide 21 formed on the optical waveguide substrate 10 via an optical fiber connector 20C.

With regard to the optical waveguide substrate 10, a core is formed by forming a quartz film as an undercladding on a silicon substrate by the CVD method and thereafter doping the quartz film with a predetermined impurity. Subsequently, an overcladding is formed, and two optical waveguides 21 and 22 are formed. In this case, the two optical waveguides 21 and 22 are formed to be adjacent to each other so that the optical signals are combined in four portions, and these four portions become 3-dB directional couplers DC1, DC2, DC3 and DC4. In this case, the directional coupler DC1 has two input ports P11 and P12 and two output ports P13 and P14, and the directional coupler DC2 has two input ports P21 and P22 and two output ports P23 and P24. The directional coupler DC3 has two input ports P31 and P32 and two output ports P33 and P34, and the directional coupler DC4 has two input ports P41 and P42 and two output ports P43 and P44.

Two arm portions are formed of the two optical waveguides 21 and 22 between the two directional couplers DC1 and DC2, two arm portions are formed of the two optical waveguides 21 and 22 between the two directional couplers DC2 and DC3, and two arm portions are formed of the two optical waveguides 21 and 22 between the two directional couplers DC3 and DC4. A resistive terminator 91 is connected with the input port P12 of the directional coupler DC1, and a resistive terminator 92 is connected with the output port P44 of the directional coupler DC4. The optical waveguide 21 has an input terminal denoted by a reference numeral P10 and an output terminal denoted by a reference numeral P50.

The polarization beam splitter section 1 is constituted by including the directional coupler DC1, the temperature control portion HT1 provided with a heater formed on the optical waveguide 21 that is one arm portion, the birefringence portion BF1 formed on the optical waveguide 22 that is the other arm portion and the directional coupler DC2. The temperature control portion HT1 is provided to control the refractive index of the optical signal that propagates through the optical waveguide 21 by controlling the temperature of the optical waveguide 21 by heating. The birefringence portion BF1 is formed by irradiating the optical waveguide 22 of the other arm portion, with ultraviolet rays having an energy of 50 mJ/cm$^2$ and a wavelength of 193 nm after being subjected to pulse intensity modulation at a frequency of 60 Hz for five minutes by means of an ArF laser apparatus 50 provided with an ArF excimer laser. This birefringence portion BF1 causes birefringence in the optical signal that propagates through the optical waveguide 22, which is the other arm portion.

Figure 2:
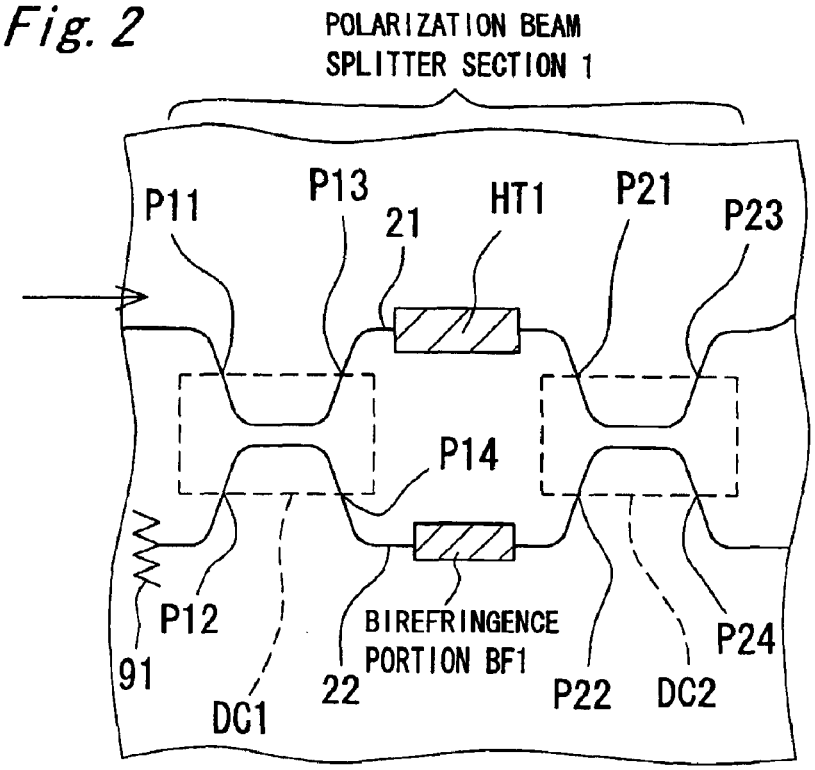
FIG. 2 is a plan view showing a detailed construction of a polarization beam splitter section 1 of FIG. 1.

The polarization beam splitter section 1 having the symmetric Mach-Zehnder interferometer is constituted by including the temperature control portion HT1 and the birefringence portion BF1 formed as above, and the principle of this operation will be described in detail below. FIG. 2 shows a detailed construction of the polarization beam splitter section 1. Since the birefringence portion BF1 is formed in the optical waveguide 22 of the other arm portion, the inputted optical signal can be split into a TE wave and a TM wave, which are polarized components perpendicular to each other, by the polarization beam splitter section 1.

Figure 3:
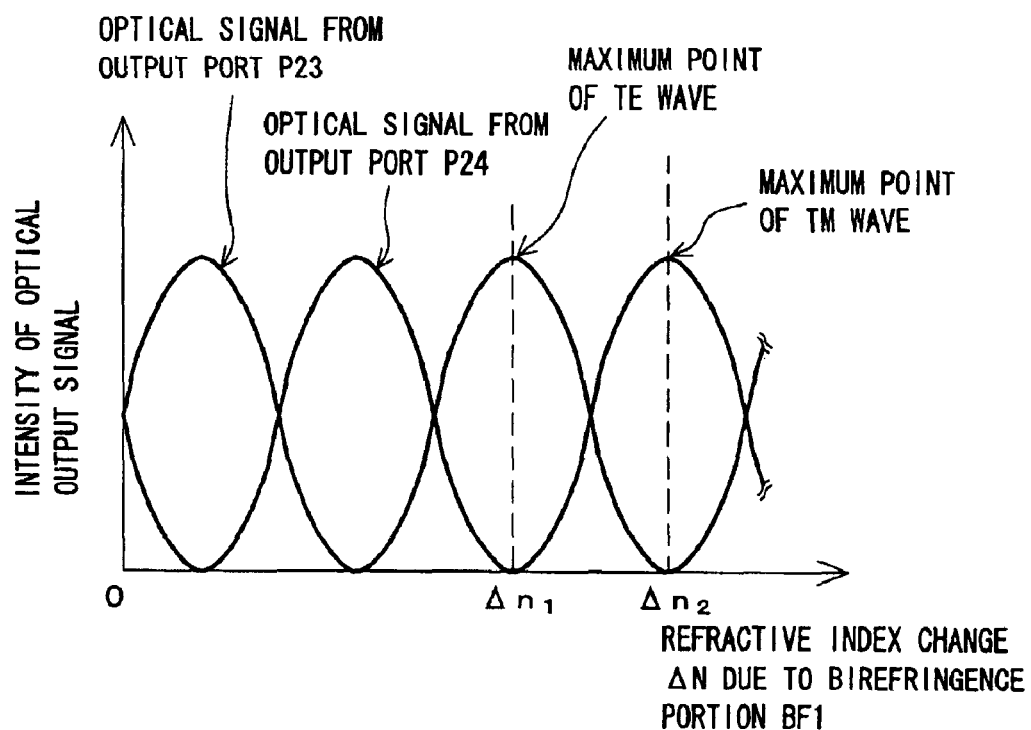
FIG. 3 is a graph showing an intensity of an optical output signal at output ports P23 and P24 of the polarization beam splitter section 1 with respect to a refractive index change $\Delta n$ due to a birefringence portion BF1 of FIG. 1.
Figure 4:
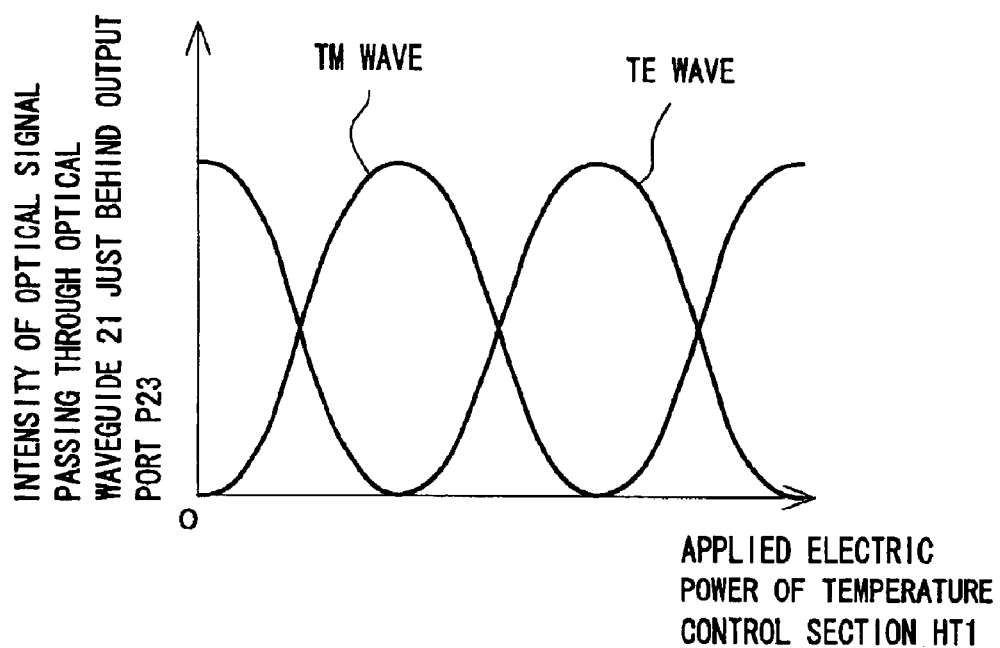
FIG. 4 is a graph showing an intensity of the optical signal that passes through an optical waveguide 21 located just behind the output port P23 with respect to an applied electric power of a temperature control portion HT1 of FIG. 1.

FIG. 3 is a graph showing an intensity of an optical output signal at the output ports P23 and P24 of the polarization beam splitter section 1 with respect to a refractive index change An due to the birefringence portion BF1 of FIG. 1. FIG. 4 is a graph showing an intensity of the optical signal that passes through the optical waveguide 21 located just behind the output port P23 with respect to the applied electric power of the temperature control portion HT1 of FIG. 1. If the refractive index in one arm portion changes in the polarization beam splitter section 1 that has the symmetric Mach-Zehnder interferometer, then the phase of the optical signal that propagates through the optical waveguide 22 changes, and the optical signal from the output ports P23 and P24 changes in intensity as shown in FIG. 3. The fact that birefringence occurs in one arm portion means that the refractive index change varies depending on the TE wave and the TM wave. Accordingly, a refractive index change $\Delta n_1$ possibly occurs in the TE wave at the maximum point of the TE wave, and a refractive index change $\Delta n_2$ possibly occurs in the TM wave at the maximum point of the TM wave. Therefore, as shown in FIG. 4, by changing the refractive index of the optical signal with the applied electric power of the temperature control portion HT1 adjusted, the TE wave is outputted from the output port P23, while the TM wave is outputted from the output port P24.

The optical delay circuit section 2 of FIG. 1 is constituted by including optical waveguides 21 and 22, which have lengths different from each other. The length of the optical waveguide 21 is set to be longer than the length of the optical waveguide 22, and the TE wave that propagates through the optical waveguide 21 is delayed in the temporal direction as compared with the TM wave that propagates through the optical waveguide 22. Due to the difference in the delay, polarization dispersion occurs between the TE wave and the TM wave.

Further, the polarization beam combiner section 3 is formed by a forming process similar to that of the polarization beam splitter section 1 and is provided with the directional coupler DC3, the temperature control portion HT2 provided with the heater formed on the optical waveguide 21 that is one arm portion, the birefringence portion BF2 formed on the optical waveguide 22 that is the other arm portion, and the directional coupler DC4.

Figure 5:
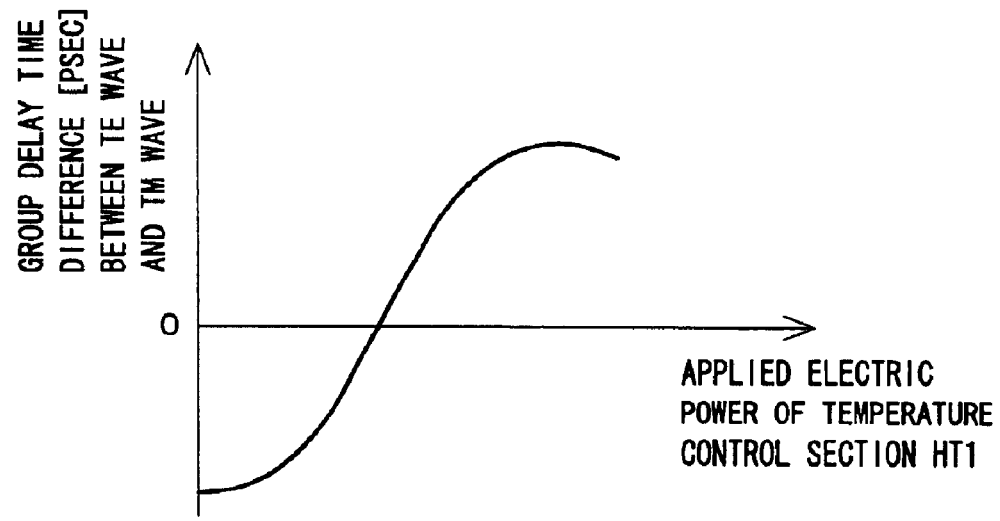
FIG. 5 is a graph showing a group delay time difference [psec] between the TE wave and the TM wave with respect to the applied electric power of the temperature control portion HT1 of FIG. 1.

At the output terminal of this polarization dispersion compensation apparatus is provided a polarization beam combiner section 3, which has the same construction as that of the polarization beam splitter section 1. With the construction of the apparatus, the refractive indexes of the optical signals that propagate through the optical waveguides 21 and 22 change by changing the electric power applied to the temperature control portion HT1, with the result that the propagation paths of the TE wave and the TM wave change as shown in FIG. 4, allowing the propagation paths of the polarized waves to be changed. As a result, a group delay time difference [psec] (corresponding to the polarization dispersion value) between the TE wave and the TM wave can be controlled as shown in FIG. 5. Further, by adjustment of the electric power applied to the temperature control portion HT2 of the polarization beam combiner section 3 in a manner similar to that of the adjustment of the electric power applied to the temperature control portion HT1 of the polarization beam splitter section 1, an optical signal can be controlled and consistently output from the output port P43.

As described above, the polarization dispersion between the TE wave and the TM wave can be adjusted in accordance with the environmental change of the optical fiber cable for transmission connected at the preceding stage of this polarization dispersion compensation apparatus so as to consistently make compensation by adjusting the temperature control portions HT1 and HT2 in a similar manner.

As compared with the prior art example, the elements, which constitute the apparatus, can be downsized and made to have a lower loss with the construction in which the optical waveguides 21 and 22 of the Mach-Zehnder structure that has birefringence in the other arm portion in the polarization beam splitter section 1 and the polarization beam combiner section 3 are employed to further perform the refractive index control of the one arm portion. Therefore, according to the present preferred embodiment, there can be provided a polarization dispersion compensation apparatus, which has a smaller size and a lighter weight than those of the prior art and is able to make compensation for the polarization dispersion with a lower loss. Furthermore, by virtue of removal of the movable portion, deterioration due to aging can be reduced, and reliability can be improved.

In the aforementioned preferred embodiment, the optical waveguide is heated by means of the heater in the temperature control portions HT1 and HT2. However, the present invention is not limited to this, and it is acceptable to control the temperature by cooling the optical waveguide by means of a cooling apparatus such as a Peltier device, so as to change the refractive index in the optical waveguide.

Second Preferred Embodiment

Figure 6:
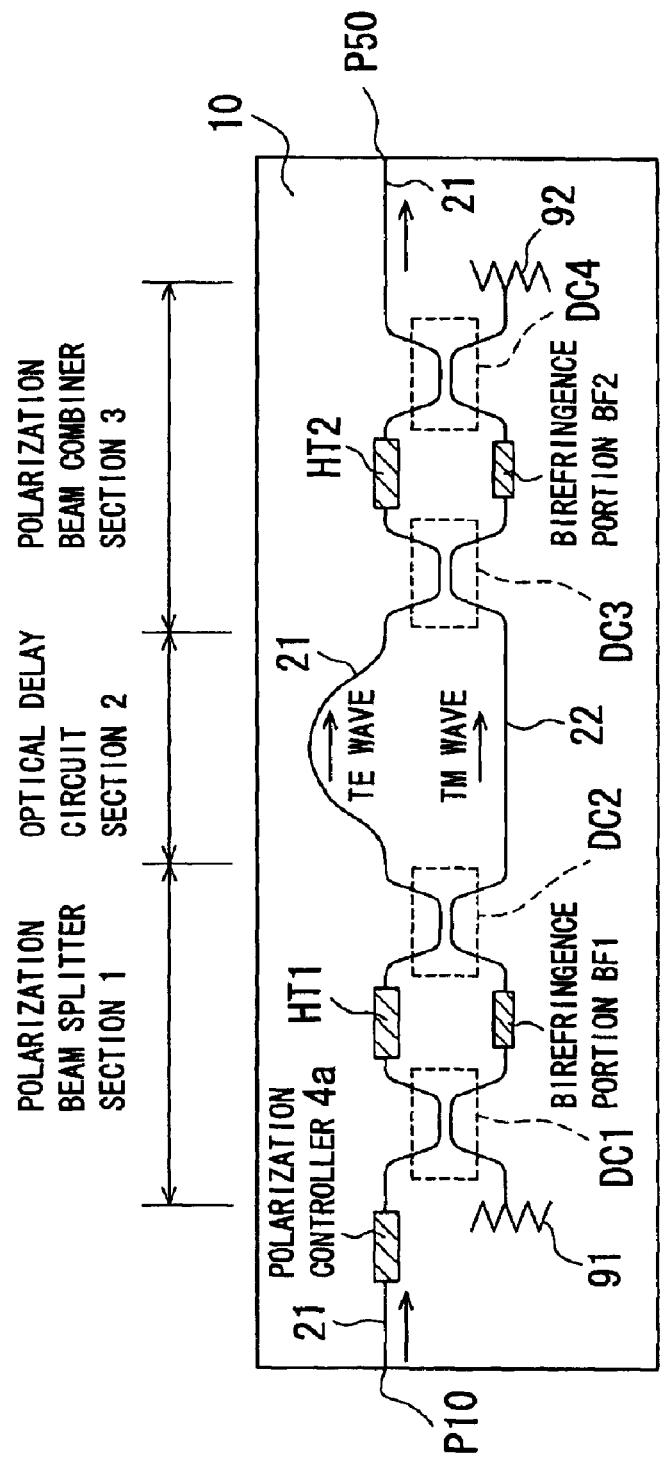
FIG. 6 is a plan view showing a construction of an optical waveguide type polarization dispersion compensation apparatus according to a second preferred embodiment of the present invention.
Figure 7:
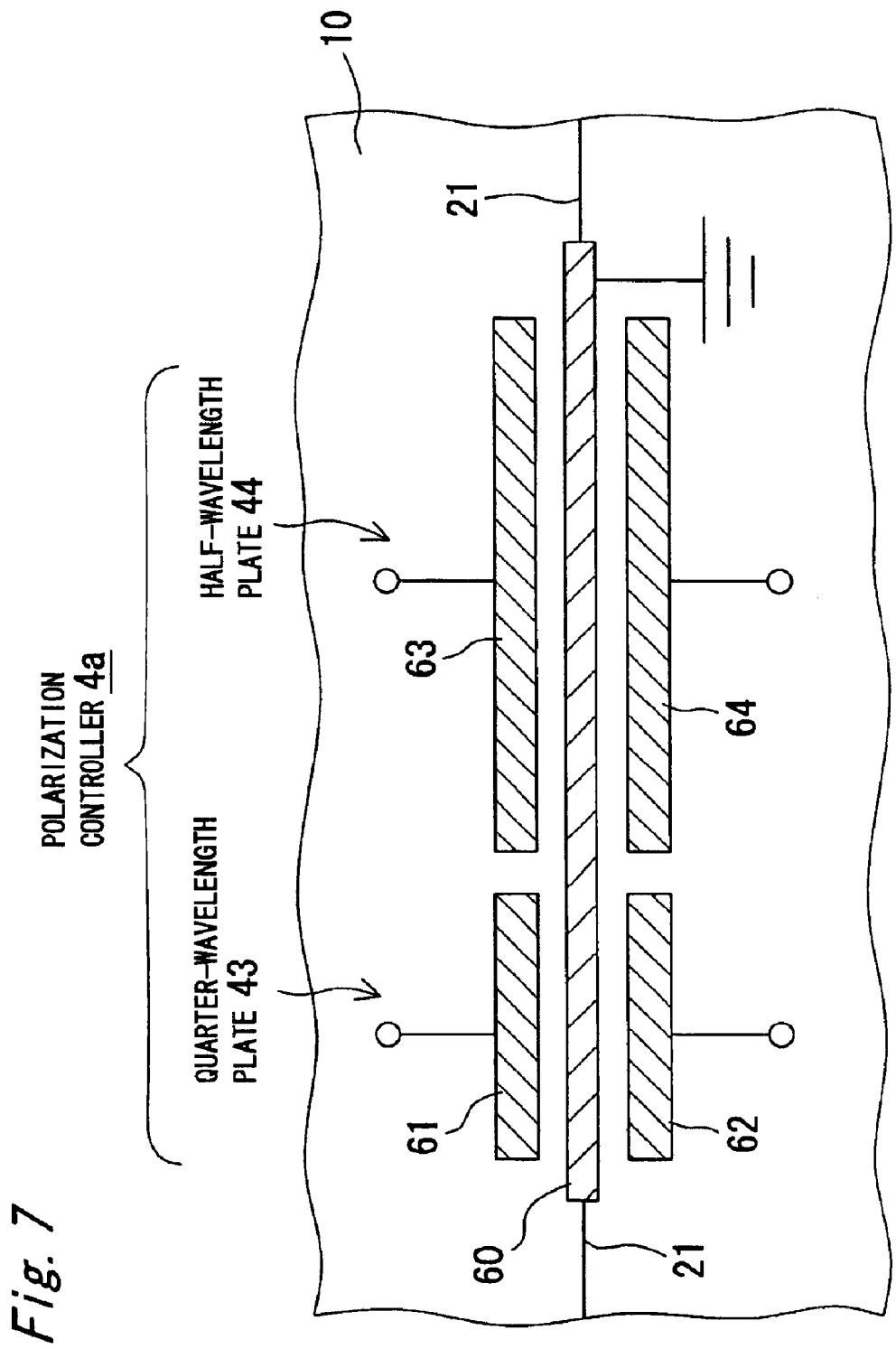
FIG. 7 is a plan view showing a detailed construction of a polarization controller 4a of FIG. 6.

FIG. 6 is a plan view showing a construction of an optical waveguide type polarization dispersion compensation apparatus according to the second preferred embodiment of the present invention, and FIG. 7 is a plan view showing a detailed construction of the polarization controller 4a of FIG. 6. The polarization dispersion compensation apparatus of this preferred embodiment is characterized in that a polarization controller 4a formed on the optical waveguide 21 shown in FIG. 7 is provided in place of the bulk type polarization controller 4 as compared with the first preferred embodiment shown in FIG. 1, and this point of difference will be described below.

Referring to FIG. 7, the polarization controller 4a is an apparatus which has been known to those skilled in the art, and is constituted by including a quarter-wavelength plate 43 and a half-wavelength plate 44. A strip-shaped grounding electrode 60 is formed on an optical waveguide 21 on an optical waveguide substrate 10 over the length in the optical signal propagation direction of the quarter-wavelength plate 43 and the half-wavelength plate 44. Moreover, in the quarter-wavelength plate 43, a pair of electrodes 61 and 62 each having a quarter wavelength is formed on both sides in the horizontal direction of the optical waveguide 21 on the optical waveguide substrate 10. By adjusting a DC voltage to be applied to a pair of electrodes 61 and 62, the polarization angle of the optical signal that propagates through the optical waveguide 21 can be rotated. Further, in the half-wavelength plate 44, a pair of electrodes 63 and 64 each having a half wavelength is formed on both sides in the horizontal direction of the optical waveguide 21 on the optical waveguide substrate 10. By adjusting a DC voltage to be applied to a pair of electrodes 63 and 64, the polarization angle of the optical signal that propagates through the optical waveguide 21 can be rotated.

In the polarization controller 4a constituted as above, the polarization angle of rotation of the optical signal that propagates through the wavelength plates 43 and 44 is adjusted by adjusting the levels of the DC voltage applied to the electrodes 61 and 62 of the quarter-wavelength plate 43 and the DC voltage applied to the electrodes 63 and 64 of the half-wavelength plate 44. By this operation, the polarization state of the optical signal is controlled so that the polarization axis of the optical signal that propagates through the optical waveguide 21 substantially coincides with the optical axis of the optical waveguide 21. By employing the polarization controller 4a in place of the polarization controller 4, all the elements can be formed on the optical waveguide substrate 10, allowing achievement of further downsizing.

Moreover, in a manner similar to that of the first preferred embodiment, a polarization dispersion compensation apparatus can be constituted by including the polarization controller 4a, the polarization beam splitter section 1, the optical delay circuit section 2 and the polarization beam combiner section 3. That is, the polarization dispersion between the TE wave and the TM wave can be adjusted in accordance with the environmental change of the optical fiber cable for transmission connected at the preceding stage of this polarization dispersion compensation apparatus so as to consistently make compensation by adjusting the temperature control portions HT1 and HT2 in a similar manner. Therefore, according to the present preferred embodiment, there can be provided a polarization dispersion compensation apparatus, which has a smaller size and a lighter weight than those of the prior art and is able to make compensation for the polarization dispersion with a lower loss. Furthermore, by virtue of removal of the movable portion, deterioration due to aging can be reduced, and reliability can be improved.

Third Preferred Embodiment

Figure 8:
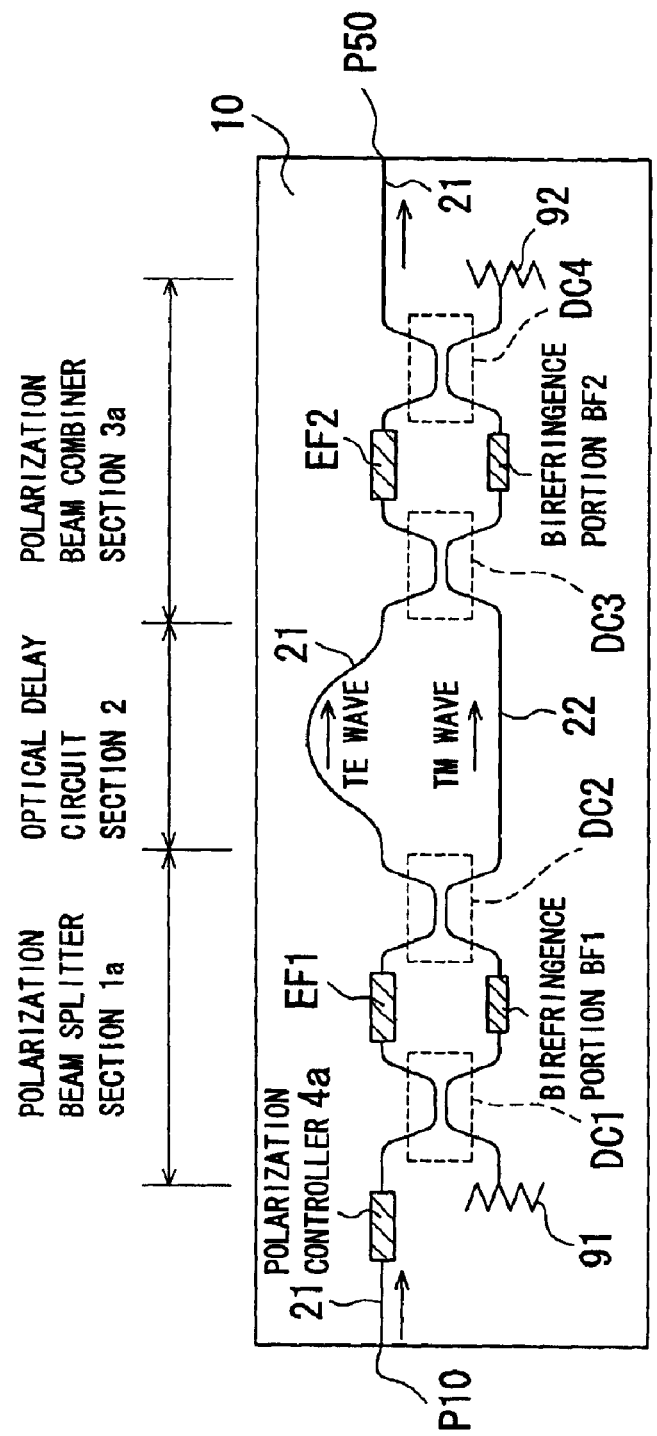
FIG. 8 is a plan view showing a construction of an optical waveguide type polarization dispersion compensation apparatus according to a third preferred embodiment of the present invention.

FIG. 8 is a plan view showing a construction of an optical waveguide type polarization dispersion compensation apparatus according to the third preferred embodiment of the present invention. The polarization dispersion compensation apparatus of this third preferred embodiment differs from the polarization dispersion compensation apparatus shown in FIG. 6 in the following points.

(a) A polarization beam splitter section 1a that has an electric field control portion EF1 is provided in place of the polarization beam splitter section 1 that has the temperature control portion HT1.

(b) A polarization beam combiner section 3a that has an electric field control portion EF2 is provided in place of the polarization beam combiner section 3 that has the temperature control portion HT2.

Figure 9:
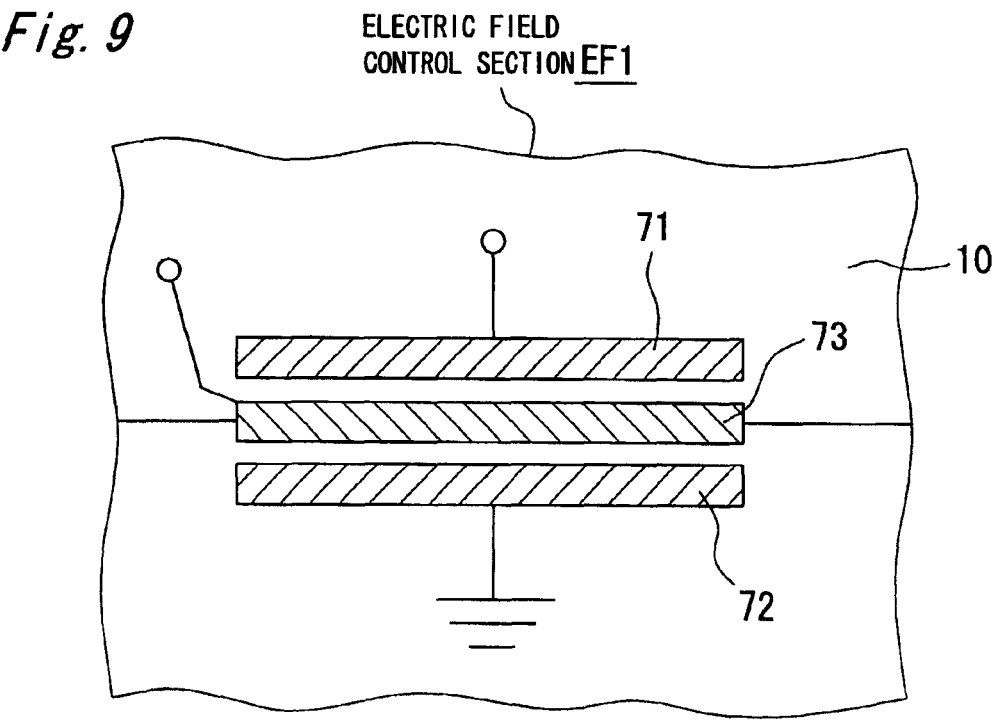
FIG. 9 is a plan view showing a detailed construction of an electric field control portion EF1 of FIG. 8.
Figure 10:
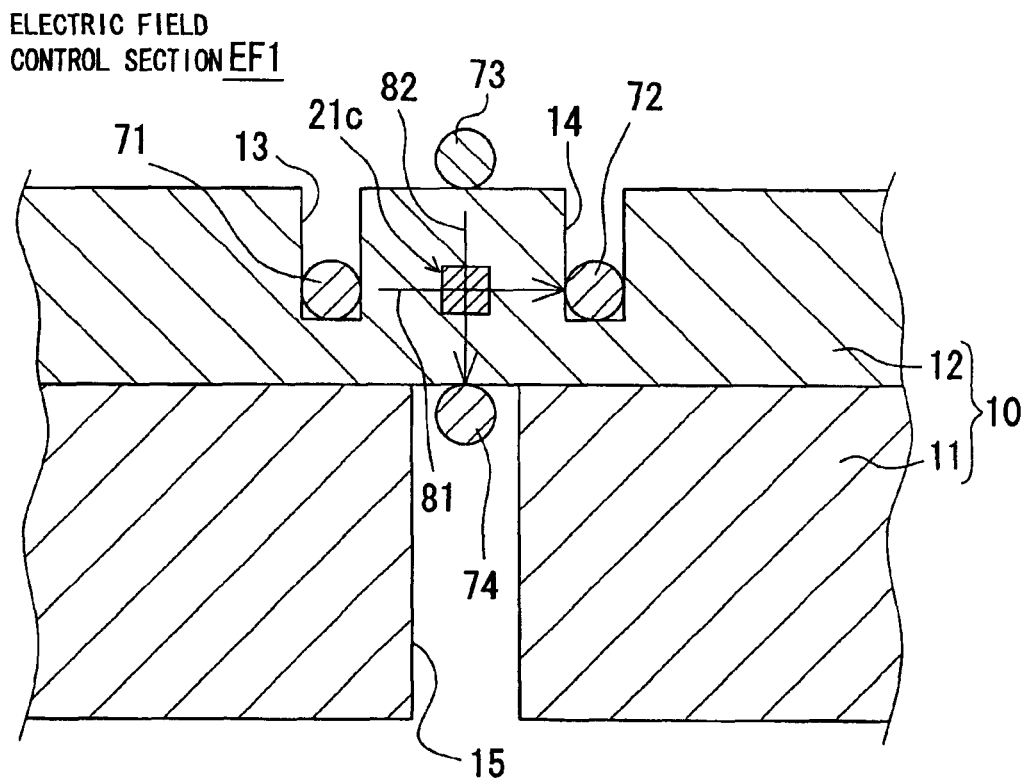
FIG. 10 is a longitudinal sectional view showing a detailed construction of the electric field control portion EF1 of FIG. 8.

These points of difference will be described below. FIG. 9 is a plan view showing a detailed construction of the electric field control portion EF1 of FIG. 8, and FIG. 10 is a longitudinal sectional view showing a detailed construction of the electric field control portion EF1 of FIG. 8. Referring to FIG. 10, an optical waveguide substrate 10 is formed by forming a quartz film 12 on a silicon substrate 11, and a core 21c of the optical waveguide 21 is formed by doping the quartz film 12 internally with an impurity. A chrome mask pattern is formed on the surface of the silicon substrate 11 by the photoengraving process, and thereafter, a groove 15 is formed by etching the silicon substrate 11 located just below the core 21c with an etchant of a volumetric ratio of hydrofluoric acid:nitric acid:acetic acid= 1:4:3. Subsequently, an electrode 74, which is a thin metallic wire, is inserted in the longitudinal direction of the core 21c so as to be brought in contact with the quartz film 12. On the other hand, an electrode 73 made of a thin metallic wire is mounted on a portion just above the core 21c while being bonded in the longitudinal direction of the core 21c. Further, a chrome mask pattern is formed on the surface of the quartz film 12 by a photoengraving process, and thereafter, grooves 13 and 14 are formed by etching both sides in the horizontal direction of the core 21c in the direction of thickness of the quartz film 12 by a reactive ion-etching method. Subsequently, electrodes 71 and 72 each made of thin metallic wire are mounted so as to be positioned on both sides of the core 21c in the horizontal direction of the core 21c and inserted in the longitudinal direction of the core 21c.

Further, by irradiating the core 21c of the optical waveguide 21 of the electric field control portion EF1 with ultraviolet rays by means of, for example, an ArF laser apparatus 50 provided with an ArF excimer laser, a polling process for ultraviolet ray excitation is performed. According to this ultraviolet ray excitation polling, a DC voltage was applied so that the electric field intensity on the core 21c of the optical waveguide 21 became about 105 V/cm with respect to the electrodes 71, 72, 73 and 74 while irradiating the optical waveguide 21 before the film formation of the grounding electrode with the ultraviolet rays of the ArF excimer laser that has an energy of 50 mJ/cm$^2$ and a wavelength of 193 nm. Subsequently, a grounding electrode film was formed, and a voltage control section EF1, or an optical waveguide type polarization controller, was formed. In this case, the glass material of the core 21c originally has no electro-optic effect since it has a centrosymmetry. However, the electric field control of the refractive index can be performed when the polling process is performed, and polarization control can be performed. Although the polling process for ultraviolet ray excitation is performed in the present preferred embodiment, it is acceptable to perform thermal excitation polling for applying an electric field while heating the optical waveguide 21.

When a DC voltage is applied to the electrodes 71, 72, 73 and 74 after the polling process is performed, different refractive index changes are caused to the TE wave and the TM wave. This means that an optical waveguide type element corresponding to the quarter-wavelength plate and the half-wavelength plate is provided by virtue of the enabled birefringence control, and the adjustment of the value of the DC voltage applied by the control signal corresponds to the adjustment of the polarization rotation angle of the polarization controller 4 of the first preferred embodiment. Therefore, the electric field control portion EF1 controls the refractive index of the optical signal that propagates through the optical waveguide 21 by controlling the DC voltage applied to the electrodes 71 to 74 provided in the optical waveguide 21 in a manner similar to that of the temperature control portion HT1. Moreover, the electric field control portion EF2 of the polarization beam combiner section 3 is formed in a manner similar to that of the electric field control portion EF1.

In the polarization controller 4a constituted as above, the polarization dispersion between the TE wave and the TM wave can be adjusted in accordance with the environmental change of the optical fiber cable for transmission connected at the preceding stage of this polarization dispersion compensation apparatus so as to consistently make compensation by adjusting the electric field control portions EF1 and EF2 in a similar manner. Therefore, according to the present preferred embodiment, there can be provided a polarization dispersion compensation apparatus, which has a smaller size and a lighter weight than those of the prior art and is able to make compensation for the polarization dispersion with a lower loss. Furthermore, by virtue of removal of the movable portion, deterioration due to aging can be reduced, and reliability can be improved. Moreover, since the refractive index is controlled by means of the electric field control portions EF1 and EF2, the switching characteristic is allowed to have a higher speed.

Fourth Preferred Embodiment

Figure 11:
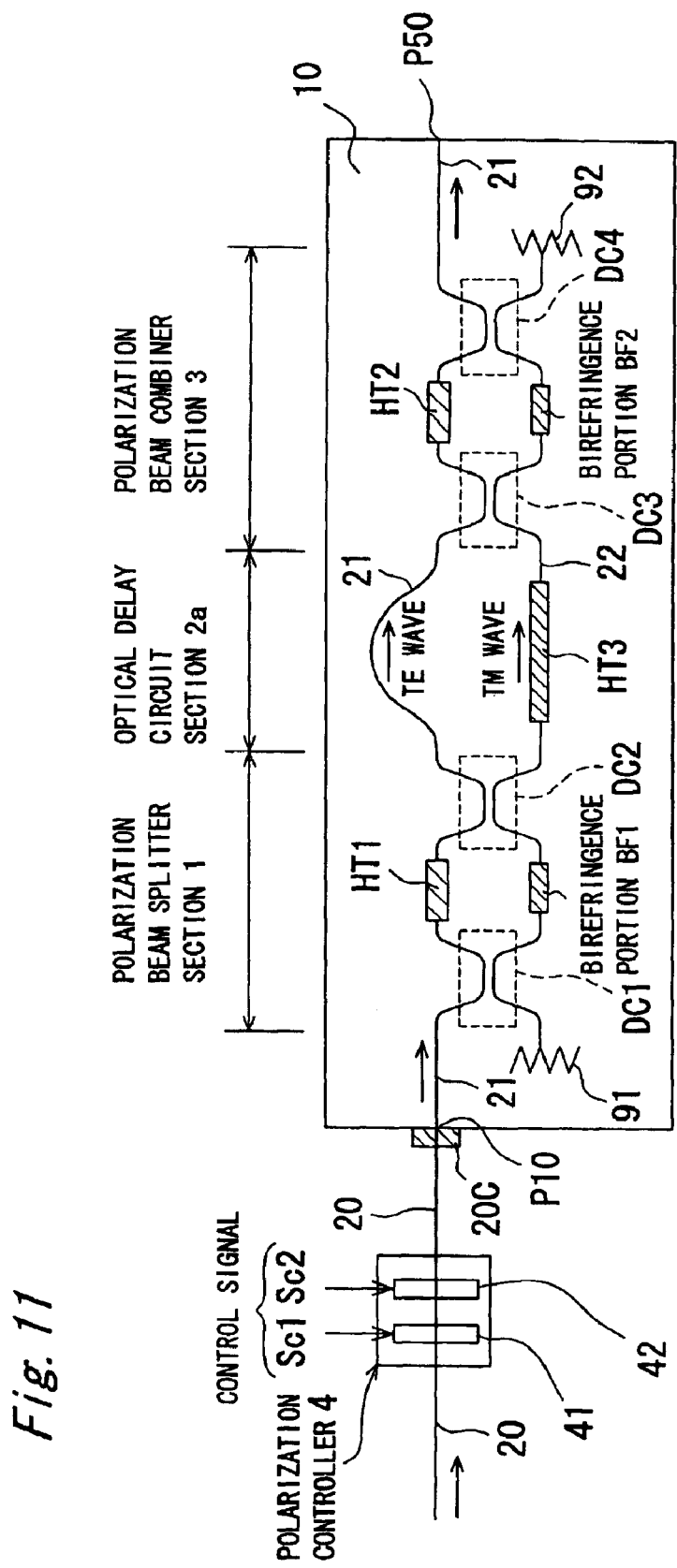
FIG. 11 is a plan view showing a construction of an optical waveguide type polarization dispersion compensation apparatus according to a fourth preferred embodiment of the present invention.

FIG. 11 is a plan view showing a construction of an optical waveguide type polarization dispersion compensation apparatus according to the fourth preferred embodiment of the present invention. The polarization dispersion compensation apparatus of this fourth preferred embodiment is characterized in that an optical delay circuit section 2a is constituted by providing a temperature control portion HT3 in the optical waveguide 22 of the optical delay circuit section 2 as compared with the first preferred embodiment shown in FIG. 1. This point of difference will be described below.

The temperature control portion HT3 is formed in a manner similar to that of the temperature control portions HT1 and HT2 and able to finely adjust the polarization dispersion value corresponding to the group delay time difference between the TE wave and the TM wave by finely adjusting the refractive index of the optical waveguide 22 with the electric power applied to the heater of the temperature control portion HT3 changed.

According to the fourth preferred embodiment constituted as above, there is such a particular advantageous effect that the polarization dispersion value corresponding to the group delay time difference between the TE wave and the TM wave can be finely adjusted by finely adjusting the refractive index of the optical waveguide 22 in addition to the operation and advantageous effects of the first preferred embodiment.

Fifth Preferred Embodiment

Figure 12:
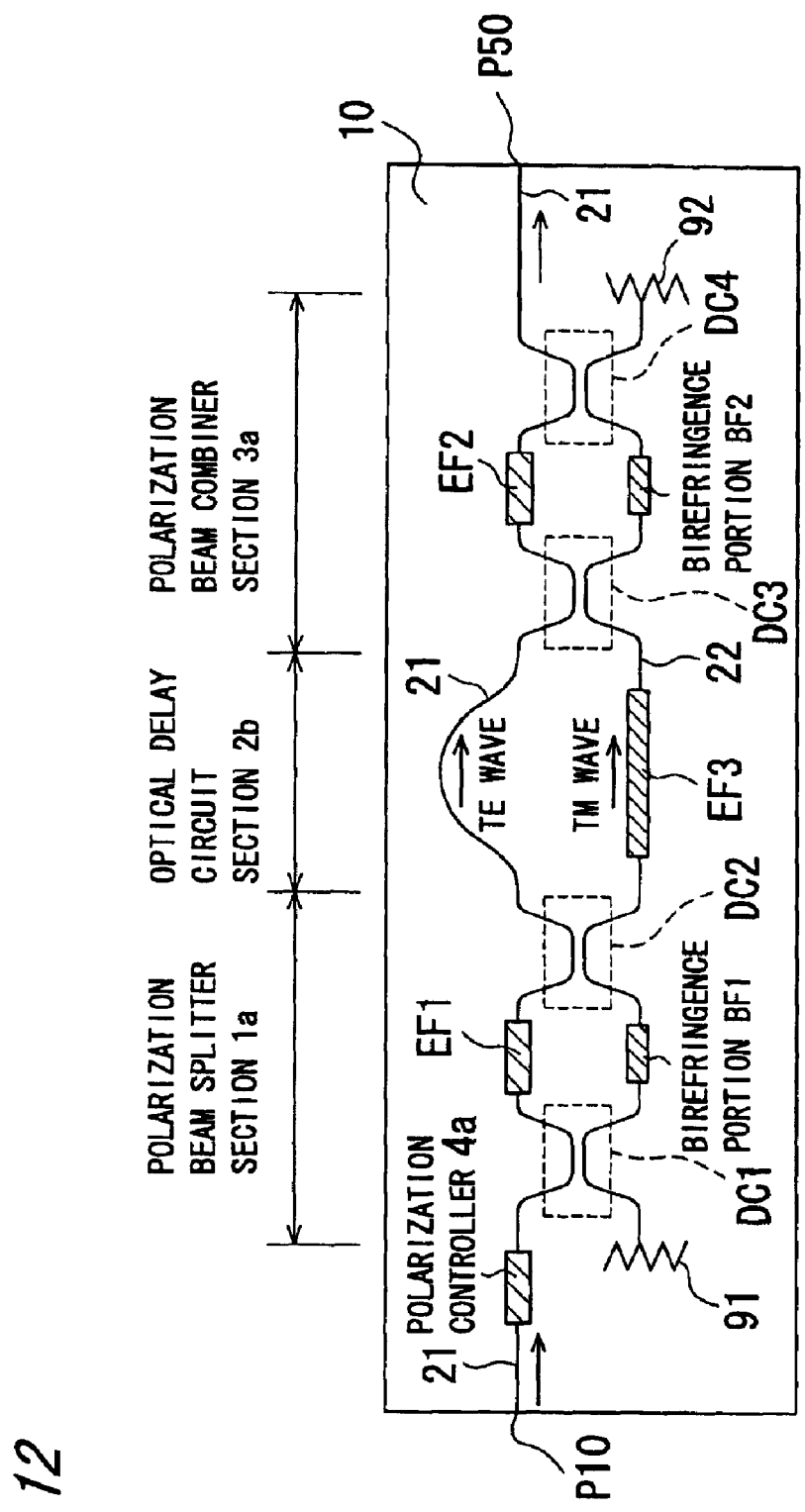
FIG. 12 is a plan view showing a construction of an optical waveguide type polarization dispersion compensation apparatus according to a fifth preferred embodiment of the present invention.

FIG. 12 is a plan view showing a construction of an optical waveguide type polarization dispersion compensation apparatus according to the fifth preferred embodiment of the present invention. The polarization dispersion compensation apparatus of this fifth preferred embodiment is characterized in that an optical delay circuit section 2b is constituted by providing an electric field control portion EF3 in the optical waveguide 22 of the optical delay circuit section 2 as compared with the third preferred embodiment shown in FIG. 8. This point of difference will be described below.

The electric field control portion EF3 is formed in a manner similar to that of the electric field control portions EF1 and EF2 and is able to finely adjust the polarization dispersion value corresponding to the group delay time difference between the TE wave and the TM wave by finely adjusting the refractive index of the optical waveguide 22 with the DC voltage applied to the electrodes of the electric field control portion EF3 changed.

According to the fifth preferred embodiment constituted as above, there is such a particular advantageous effect that the polarization dispersion value corresponding to the group delay time difference between the TE wave and the TM wave can be finely adjusted by finely adjusting the refractive index of the optical waveguide 22 in addition to the operation and advantageous effects of the third preferred embodiment.

Sixth Preferred Embodiment

Figure 13:
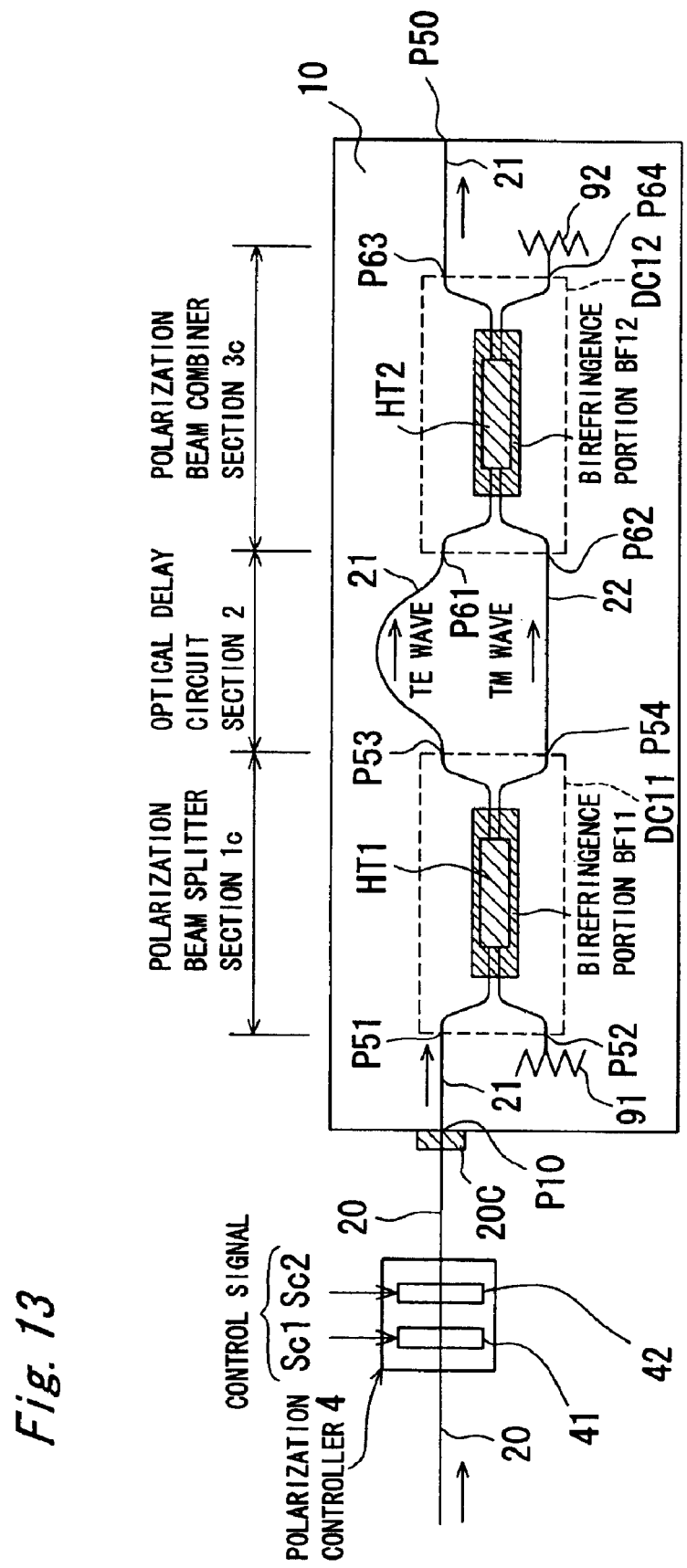
FIG. 13 is a plan view showing a construction of an optical waveguide type polarization dispersion compensation apparatus according to a sixth preferred embodiment of the present invention.

FIG. 13 is a plan view showing a construction of an optical waveguide type polarization dispersion compensation apparatus according to the sixth preferred embodiment of the present invention. The polarization dispersion compensation apparatus of this sixth preferred embodiment differs from the first preferred embodiment shown in FIG. 1 in the following points.

(a) A birefringence portion BF11 is formed in the mutually adjacent portions of the optical waveguides 21 and 22 of a directional coupler DC11 in place of the polarization beam splitter section 1, and a polarization beam splitter section 1c constituted by forming a temperature control portion HT1 is provided.

(b) A birefringence portion BF12 is formed in the mutually adjacent portions of the optical waveguides 21 and 22 of a directional coupler DC12 in place of the polarized polarization beam combiner section 3, and a polarization beam combiner section 3c constituted by forming a temperature control portion HT2 is provided.

These points of difference will be described below. The polarization dispersion compensation apparatus of this preferred embodiment is constituted by including a polarization controller 4, a polarization beam splitter section 1c, an optical delay circuit section 2 and a polarization beam combiner section 3c.

On the optical waveguide substrate 10, two optical waveguides 21 and 22 are formed to be adjacent to each other so that optical signals are combined with each other in two portions, and these two portions become the 3-dB directional couplers DC11 and DC12. In this case, the directional coupler DC11 has two input ports P51 and P52 as well as two output ports P53 and P54, and the directional coupler DC12 has two input ports P61 and P62 as well as two output ports P63 and P64.

In the polarization beam splitter section 1c, the birefringence portion BF11 is formed by irradiating the mutually adjacent two optical waveguides 21 and 22 of the directional coupler DC11 with ultraviolet rays, which have an energy of 50 mJ/cm$^2$ and a wavelength of 193 nm and is subjected to pulse intensity modulation at a frequency of 60 Hz for five minutes by means of an ArF laser apparatus 50 provided with an ArF excimer laser. This birefringence portion BF11 causes birefringence in the optical signal that propagates through the optical waveguide 22 that is the other arm portion. Further, in the formation position of this birefringence portion BF11, a temperature control portion HT1 is formed. The temperature control portion HT1 is provided to control the refractive index of the optical signal that propagates through the optical waveguides 21 and 22 by controlling the temperature of the optical waveguides 21 and 22 by heating.

A polarization beam splitter section 1c is provided with the temperature control portion HT1 and the birefringence portion BF11, which are thus formed. By virtue of the polarization beam splitter section 1c, the inputted optical signal can be split into the TE wave and the TM wave, which are polarized components perpendicular to each other, in a manner similar to that of the polarization beam splitter section 1. That is, the TE wave is outputted from the output port P53, while the TM wave is outputted from the output port P54.

Moreover, in a manner similar to that of the polarization beam splitter section 1c, there is formed a polarization beam combiner section 3c provided with a birefringence portion BF12 and a temperature control portion HT2 at the subsequent stage of the optical delay circuit section 2. The TE wave and the TM wave split by the polarization beam splitter section 1c are combined by this polarization beam combiner section 3c, and an optical signal obtained after the combining is outputted from the output port P63.

As described above, the polarization dispersion between the TE wave and the TM wave can be adjusted in accordance with the environmental change of the optical fiber cable for transmission connected at the preceding stage of this polarization dispersion compensation apparatus so as to consistently make compensation by adjusting the temperature control portions HT1 and HT2 in a similar manner.

As compared with the prior art example, the elements, which constitute the apparatus, can further be downsized and made to have a lower loss with the construction in which the optical waveguides 21 and 22 that has birefringence in the polarization beam splitter 1c and the polarization beam combiner section 3c are employed to further perform the refractive index control. Therefore, according to the present preferred embodiment, there can be provided a polarization dispersion compensation apparatus, which has a smaller size and a lighter weight than those of the prior art and is able to make compensation for the polarization dispersion with a lower loss. Furthermore, by virtue of removal of the movable portion, deterioration due to aging can be reduced, and reliability can be improved.

In the aforementioned sixth preferred embodiment, the temperature control portions HT1 and HT2 are formed. However, the present invention is not limited to this, and it is acceptable to form electric field control portions EF1 and EF2 in place of the temperature control portions HT1 and HT2.

Seventh Preferred Embodiment

Figure 14:
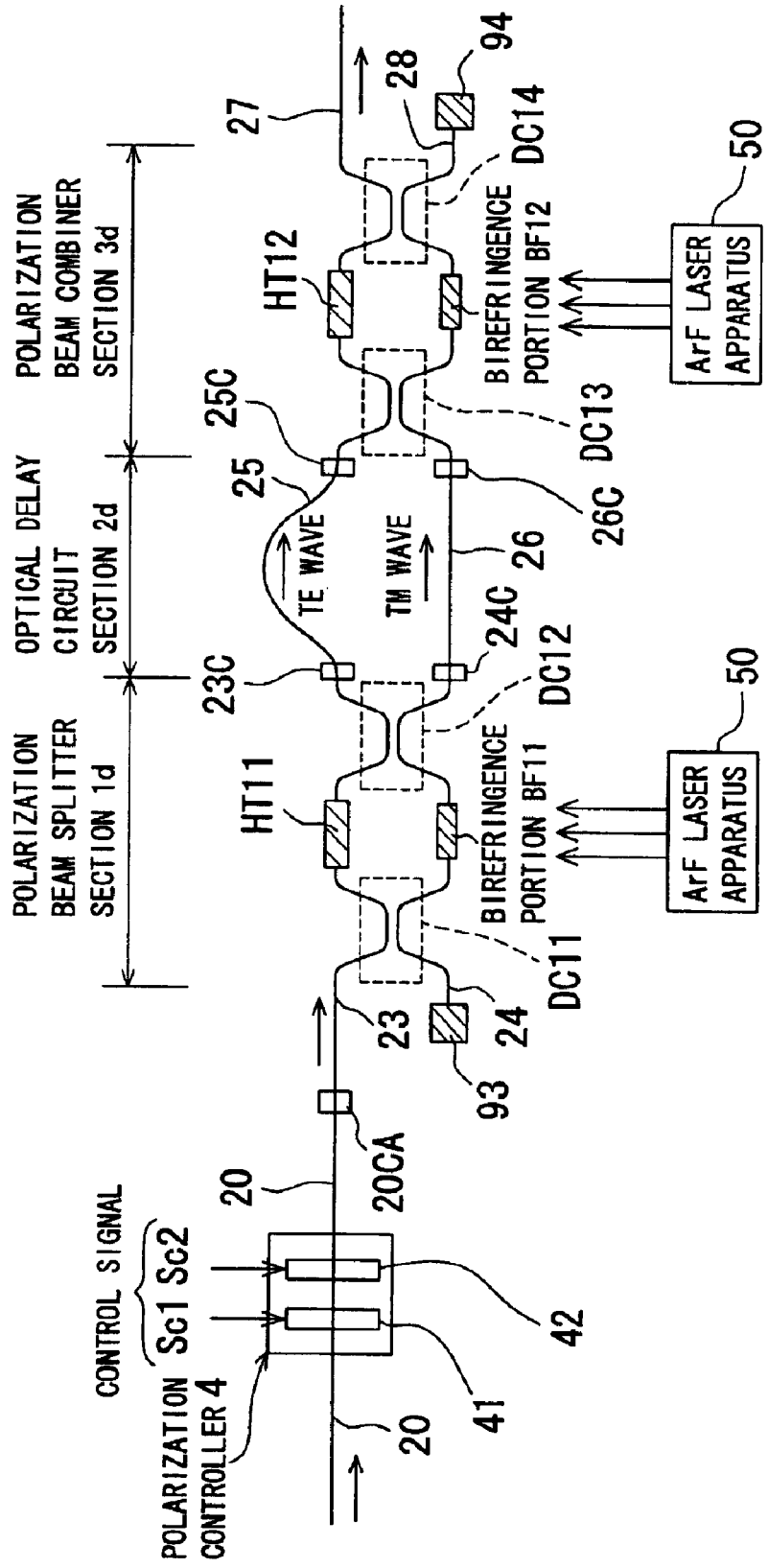
FIG. 14 is a plan view showing a construction of an optical fiber cable type polarization dispersion compensation apparatus according to a seventh preferred embodiment of the present invention.

FIG. 14 is a plan view showing a construction of an optical fiber cable type polarization dispersion compensation apparatus according to the seventh preferred embodiment of the present invention. The polarization dispersion compensation apparatus of this seventh preferred embodiment is characterized in that the optical waveguides 21 and 22 in the polarization beam splitter section 1, the optical delay circuit section 2 and the polarization beam combiner section 3 are constituted by including optical fiber cables 23, 24, 25, 26, 27 and 28 as compared with the first preferred embodiment shown in FIG. 1.

Referring to FIG. 14, the polarization dispersion compensation apparatus of this preferred embodiment is constituted by including a polarization controller 4, a polarization beam splitter section 1d, an optical delay circuit section 2d and a polarization beam combiner section 3d. The optical fiber cable 20 located on the input side where the polarization controller 4 is provided is connected with the optical fiber cable 23 of the polarization beam splitter section 1d via an optical fiber connector 20CA.

The two optical fiber cables 23 and 24 of the polarization beam splitter section 1d are formed to be adjacent to each other in two places, and the adjacent portions constitute 3-dB directional couplers DC11 and DC12, respectively. A resistive terminator 93 is connected with the input terminal of the optical fiber cable 24 of the directional coupler DC11. Moreover, the two optical fiber cables 23 and 24 located between the two directional couplers DC11 and DC12 constitute two arm portions of a symmetric Mach-Zehnder interferometer, respectively. A temperature control portion HT11 is formed in one arm portion, while a birefringence portion BF11 formed of an ArF laser apparatus 50 is provided in the other arm portion.

Further, the optical fiber cable 23 located on the output side of the directional coupler DC12 is connected with an optical fiber cable 25 of the optical delay circuit section 2d via an optical fiber connector 23C. The optical fiber cable 24 located on the output side of the directional coupler DC12 is connected with an optical fiber cable 26 of the optical delay circuit section 2d via an optical fiber connector 24C. In this case, the optical fiber cable 25 and the optical fiber cable 26 are formed so as to have lengths different from each other. Furthermore, the terminal of the optical fiber cable 25 is connected with an optical fiber cable 27 of the polarization beam combiner section 3d via an optical fiber connector 25C. The terminal of the optical fiber cable 26 is connected with an optical fiber cable 28 of the polarization beam combiner section 3d via an optical fiber connector 26C. It is to be noted that a resistive terminator 28 is provided at the terminal of the optical fiber cable 28.

The two optical fiber cables 27 and 28 of the polarization beam combiner section 3d are formed to be adjacent to each other in two places, and the adjacent portions constitute 3-dB directional couplers DC13 and DC14, respectively. The two optical fiber cables 27 and 28 located between the two directional couplers DC13 and DC14 constitute two arm portions of a symmetric Mach-Zehnder interferometer, respectively. A temperature control portion HT12 is formed in one arm portion, while a birefringence portion BF12 formed of an ArF laser apparatus 50 is provided in the other arm portion.

By executing the adjustment of the electric power applied to the temperature control portion HT12 of the polarization beam combiner section 3d in the polarization dispersion compensation apparatus constituted as above in a manner similar to that of the adjustment method of the electric power applied to the temperature control portion HT11 of the polarization beam splitter section 1d, it can be controlled so that an optical signal is consistently outputted from the terminal portion of the optical fiber cable 27. Therefore, the polarization dispersion between the TE wave and the TM wave can be adjusted in accordance with the environmental change of the optical fiber cable for transmission connected at the preceding stage of this polarization dispersion compensation apparatus so as to consistently make compensation by adjusting the temperature control portions HT11 and HT12 in a similar manner.

As compared with the prior art example, the elements, which constitute the apparatus, can be downsized and made to have a lower loss with the construction in which the optical fiber cables of the Mach-Zehnder structure that has birefringence are employed in the other arm portion in the polarization beam splitter 1d and the polarization beam combiner section 3d to further perform the refractive index control of one arm portion. Therefore, according to the present preferred embodiment, there can be provided a polarization dispersion compensation apparatus, which has a smaller size and a lighter weight than those of the prior art and is able to make compensation for the polarization dispersion with a lower loss. Furthermore, by virtue of removal of the movable portion, deterioration due to aging can be reduced, and reliability can be improved.

In the aforementioned seventh preferred embodiment, the temperature control portions HT11 and HT12 are formed. However, the present invention is not limited to this, and it is acceptable to form electric field control portions EF1 and EF2 in place of the temperature control portions HT11 and HT12.

Eighth Preferred Embodiment

Figure 15:
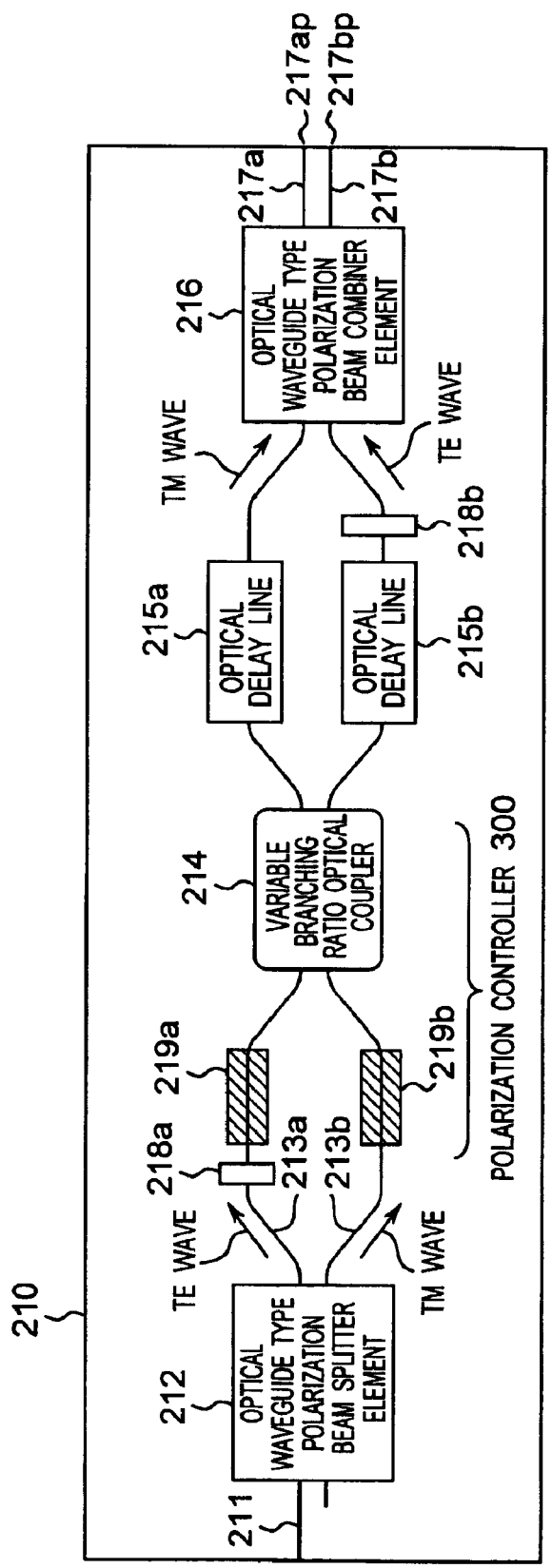
FIG. 15 is a plan view showing a construction of an optical waveguide type polarization dispersion compensation apparatus according to an eighth preferred embodiment of the present invention.

FIG. 15 is a plan view showing a construction of an optical waveguide type polarization dispersion compensation apparatus according to the eighth preferred embodiment of the present invention.

Referring to FIG. 15, an input channel optical waveguide 211, an optical waveguide type polarization beam splitter element 212, a pair of optical waveguides 213a and 213b, a variable branching ratio optical coupler 214, a pair of optical delay lines 215a and 215b, an optical waveguide type polarization beam combiner element 216, output channel optical waveguides 217a and 217b are successively formed on a silicon substrate 210. Further, polarization change means 218a and 218b are formed in each of a pair of optical waveguides 213a and 213b and a pair of optical delay lines 215a and 215b. Moreover, phase adjustment means 219a and 219b for adjusting the relative phase difference are formed in a pair of optical waveguides 213a and 213b. In this case, one input port of the optical waveguide type polarization beam splitter element 212 is optically connected with the input channel optical waveguide 211, and two input ports of the variable branching ratio optical coupler 214 are optically connected with the two output ports of the optical waveguide type polarization beam splitter element 212 via a pair of optical waveguides 213a and 213b. Moreover, a pair of optical delay lines 215a and 215b has one end optically connected with the two output ports of the variable branching ratio optical coupler 214 and the other end optically connected with the two input ports of the optical waveguide type polarization beam combiner element 216. Two output ports of the optical waveguide type polarization beam combiner element 216 are optically connected with the output channel optical waveguides 217a and 217b.

In this case, the optical waveguide type polarization beam splitter element 212 is constituted in a manner similar to that of the polarization beam splitter sections 1, 1a and 1c, and the optical waveguide type polarization beam combiner element 216 is constituted in a manner similar to that of the polarization beam combiner sections 3, 3a and 3c. The optical waveguide type polarization beam combiner element 216 is a so-called 90 degrees hybrid circuit, and the terminal portions of the output channel optical waveguides 217a and 217b optically connected with the two output ports of the optical waveguide type polarization beam combiner element 216 are referred to as a first output port 217ap that outputs a combined optical signal and a second output port 217b that outputs no combined optical signal, respectively.

The polarization change means 218a and 218b are constituted by inserting a half-wavelength plate in the optical waveguide, and the phase adjustment means 219a and 219b are constituted by forming a temperature control portion of a thin film heater or the like in the optical waveguide. Further, the variable branching ratio optical coupler 214 can be constituted by providing a Mach-Zehnder type interferometer with two optical output couplers having two inputs and two outputs, and two-arm optical waveguides for connecting them and forming a temperature control portion of a thin film heater or the like on one arm optical waveguide. In this case, if the optical path length difference between the two arm optical waveguides is adjusted by controlling the temperature control portion, then the branching ratio from the two inputs of one optical coupler to the two outputs of the other optical coupler can be changed.

The polarization change means 218a, which is formed in the optical waveguide 213a in this preferred embodiment, may be formed in the optical waveguide 213b. The phase adjustment means 219a and 219b, which are formed respectively in the optical waveguides 213a and 213b, may be provided in either one of the optical waveguides 213a and 213b. Moreover, it is acceptable to exchange the positions of the polarization change means 218a and the phase adjustment means 219a. Furthermore, the polarization change means 218b, which is formed in the optical delay line 215b in this case, may be formed in the optical delay line 215a. It is also acceptable to exchange the positions of the polarization change means 218b and the optical delay line 215b.

In the polarization dispersion compensation apparatus constituted as above, the phase adjustment means 219a and 219b and the variable branching ratio optical coupler 214 operate as a polarization controller 300, and the optical delay lines 215a and 215b operate as a variable delay line, constituting a polarization dispersion compensation circuit as a whole. With this arrangement, this polarization dispersion compensation circuit can make compensation for the primary polarization dispersion in the optical transmission line.

A polarization dispersion compensation control method according to the present invention with this polarization dispersion compensation apparatus will be described below.

As described above, the linearly polarized waves of the TM wave and the TE wave are incident onto the optical delay lines 215a and 215b. Accordingly, the linearly polarized waves perpendicular to each other are combined in the optical waveguide type polarization combiner element 216, and all the optical output signals should be outputted to the first output port 217ap. Therefore, by controlling the phase adjustment means 219a and 219b and the variable branching ratio coupler 214 so that the signal level of the optical signal outputted from the first output port 217ap becomes the maximum or the signal level of the optical signal outputted from the second output port 217bp becomes the minimum, the polarization in the optical delay lines 215a and 215b can be adjusted to the optimum state. By controlling the amount of delay in the optical delay lines 215a and 215b in a manner that the signal component of the frequency being half the bit rate frequency is extracted from the received signal obtained by demodulating the optical signal received at the first output port 217ap and the signal level of this signal component becomes the maximum, then the optimum state is obtained. The polarization controller 300 and the optical delay lines 215a and 215b can be individually adjusted by using the method as described above, and therefore, realistic control can be performed.

Although the optical signal is outputted from the first output port according to the setting of this preferred embodiment, it is also possible to adopt the setting of outputting the optical signal from the second output port. For example, if the refractive index of the arm portion of the optical waveguide type polarization beam combiner element 216 constituted by including the Mach-Zehnder interferometer is adjusted by the heater to shift the phase of the optical signal only by 180 degrees, then the setting of outputting the optical signal from the second output port is achieved. In this case, by controlling the polarization controller so that the signal level of the optical signal outputted from the second output port becomes the maximum or the signal level of the optical signal outputted from the first output port becomes the minimum, the polarization in the optical delay lines can be adjusted to the optimum state.

As described above, according to the prior art disclosed in the third prior art document, the control of compensating polarization dispersion was difficult. However, according to the present preferred embodiment, the control of compensating the polarization dispersion can be remarkably simplified as compared with the prior art.

Ninth Preferred Embodiment

Figure 16:
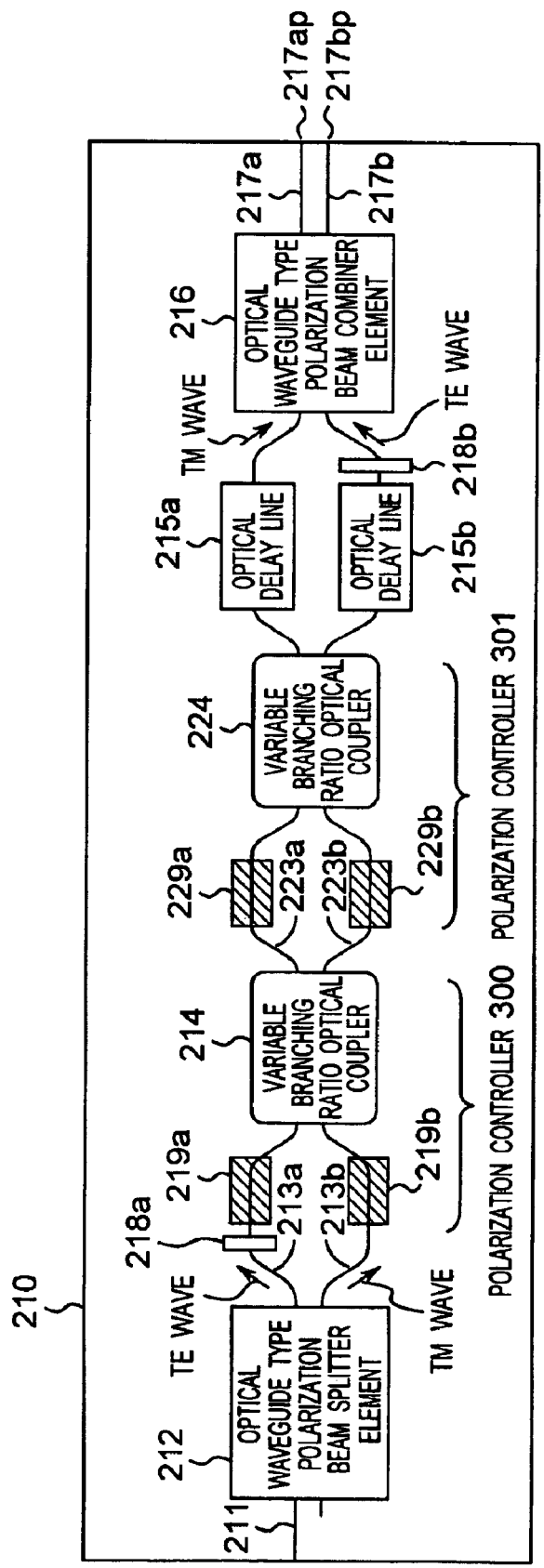
FIG. 16 is a plan view showing a construction of an optical waveguide type polarization dispersion compensation apparatus according to a ninth preferred embodiment of the present invention.

FIG. 16 is a plan view showing a construction of an optical waveguide type polarization dispersion compensation apparatus according to the ninth preferred embodiment of the present invention. The polarization dispersion compensation apparatus of this preferred embodiment is characterized in that another polarization controller 301 is inserted between the polarization controller 300 and the optical delay lines 215a and 215b as compared with the eighth preferred embodiment shown in FIG. 15. This point of difference will be described below.

Another polarization controller 301 is constituted by including phase adjustment means 229a and 229b formed in arm portion optical waveguides 223a and 223b optically connected with two output ports of a variable branching ratio optical coupler 214 and a variable branching ratio optical coupler 224 optically connected at the subsequent stage. In the polarization dispersion compensation apparatus constituted as above, the restriction on the adjustable amount of phase can be alleviated as compared with the eighth preferred embodiment that has only one polarization controller 300.

Even in this polarization dispersion compensation apparatus, by controlling the phase adjustment means 219a, 219b, 229a and 229b and the variable branching ratio coupler 214 so that the signal level of the optical signal outputted from the first output port 217ap becomes the maximum or the signal level of the optical signal outputted from the second output port 217bp becomes the minimum in a manner similar to that of the eighth preferred embodiment, the polarization in the optical delay lines 215a and 215b can be adjusted to the optimum state. Therefore, difficulties in controlling the polarization controllers 300 and 301 are alleviated.

As described above, the control of compensating polarization dispersion was difficult according to the prior art disclosed in the third prior art document. However, according to the present preferred embodiment, the control of compensating polarization dispersion can be remarkably simplified as compared with the prior art.

The aforementioned eighth and ninth preferred embodiments describes the method for controlling the amount of polarization dispersion compensation by changing the amount of delay of the optical delay lines 215a and 215b. For example, even in the polarization dispersion compensation apparatus of a type such that the amount of delay is changed by adjusting the branching ratio of the optical signals in the optical delay lines 215a and 215b by means of the variable branching ratio couplers 214 and 224 or the like at the preceding stage of the optical delay lines 215a and 215b with the amount of delay fixed, the method for executing control so that the signal level of the optical signal outputted from the first output port 217ap becomes the maximum or the signal level of the optical signal outputted from the second output port 217bp becomes the minimum is extremely useful.

Modified Preferred Embodiments

Figure 17:
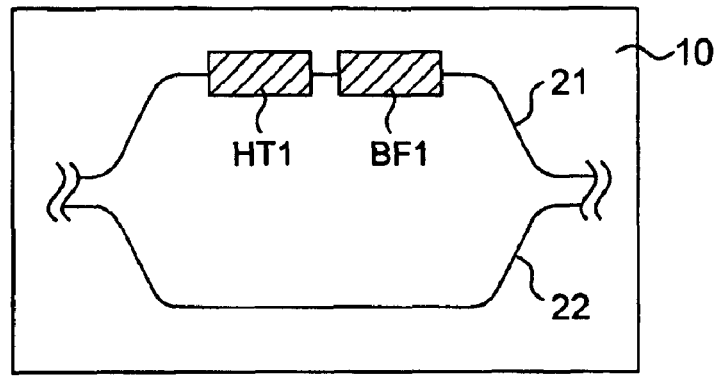
FIG. 17 is a plan view showing a construction of part of a polarization beam splitter section 1 for an optical waveguide type polarization dispersion compensation apparatus according to a first modified preferred embodiment of the present invention.

FIG. 17 is a plan view showing a construction of part of a polarization beam splitter section 1 for an optical waveguide type polarization dispersion compensation apparatus according to the first modified preferred embodiment of the present invention. In the polarization beam splitter section 1 of FIG. 1, the temperature control portion HT1 and the birefringence portion BF1 are formed the arm portions. However, as shown in FIG. 17, it is acceptable to form the temperature control portion HT1 and the birefringence portion BF1 in concatenation in one arm portion of the polarization beam splitter section 1.

Figure 18:
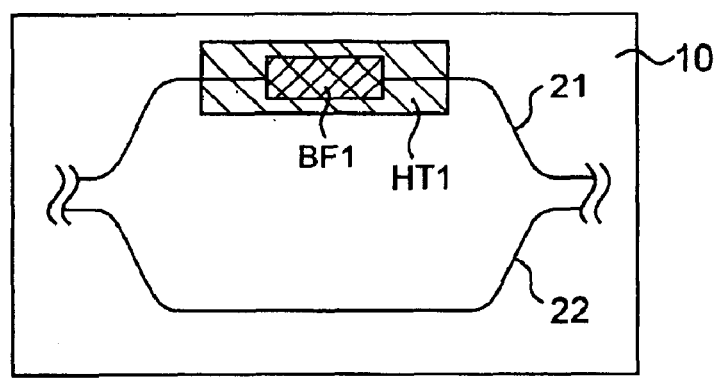
FIG. 18 is a plan view showing a construction of part of a polarization beam splitter section 1 for an optical waveguide type polarization dispersion compensation apparatus according to a second modified preferred embodiment of the present invention.

FIG. 18 is a plan view showing a construction of part of a polarization beam splitter section 1 for an optical waveguide type polarization dispersion compensation apparatus according to the second modified preferred embodiment of the present invention. As shown in FIG. 18, it is acceptable to form the temperature control portion HT1 and the birefringence portion BF1 in a superposing manner in one arm portion of the polarization beam splitter section 1.

Figure 19:
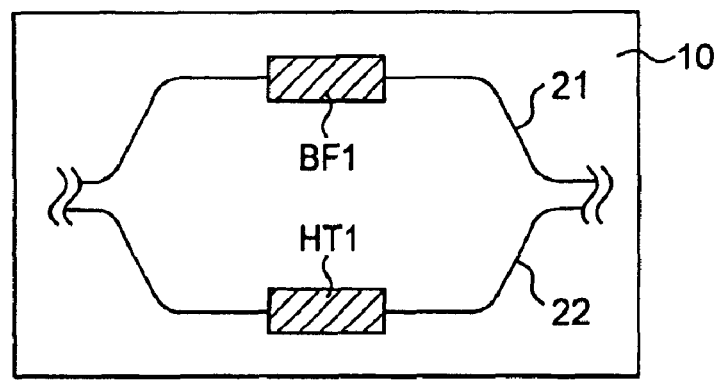
FIG. 19 is a plan view showing a construction of part of a polarization beam splitter section 1 for an optical waveguide type polarization dispersion compensation apparatus according to a third modified preferred embodiment of the present invention.

FIG. 19 is a plan view showing a construction of part of a polarization beam splitter section 1 for an optical waveguide type polarization dispersion compensation apparatus according to the third modified preferred embodiment of the present invention. As shown in FIG. 19, it is acceptable to form the birefringence portion BF1 in one arm portion of the polarization beam splitter section 1 and form the temperature control portion HT1 in the other arm portion.

Figure 20:
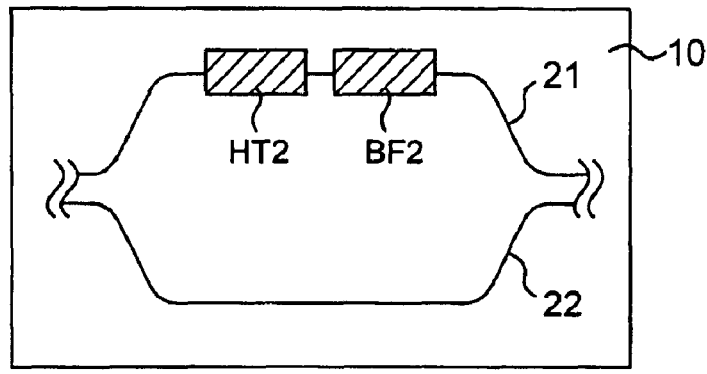
FIG. 20 is a plan view showing a construction of part of a polarization beam combiner section 3 for an optical waveguide type polarization dispersion compensation apparatus according to a fourth modified preferred embodiment of the present invention.

FIG. 20 is a plan view showing a construction of part of a polarization beam combiner section 3 for an optical waveguide type polarization dispersion compensation apparatus according to the fourth modified preferred embodiment of the present invention. In the polarization beam combiner section 3 of FIG. 1, the temperature control portion HT2 and the birefringence portion BF2 are formed in the arm portions. However, as shown in FIG. 20, it is acceptable to form the temperature control portion HT2 and the birefringence portion BF2 in concatenation in one arm portion of the polarization beam combiner section 3.

Figure 21:
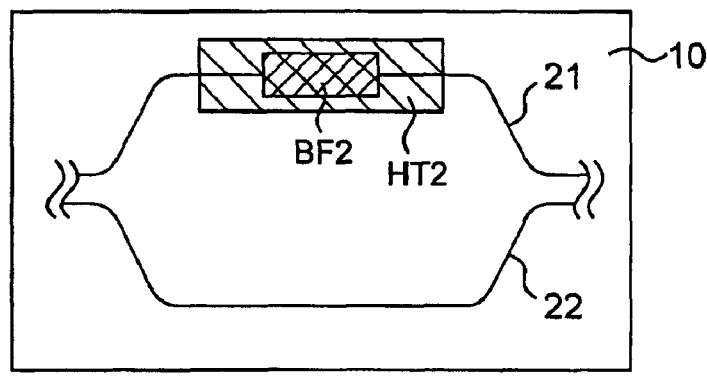
FIG. 21 is a plan view showing a construction of part of a polarization beam combiner section 3 for an optical waveguide type polarization dispersion compensation apparatus according to a fifth modified preferred embodiment of the present invention.

FIG. 21 is a plan view showing a construction of part of a polarization beam combiner section 3 for an optical waveguide type polarization dispersion compensation apparatus according to the fifth modified preferred embodiment of the present invention. As shown in FIG. 21, it is acceptable to form the temperature control portion HT2 and the birefringence portion BF2 in a superposing manner in one arm portion of the polarization beam combiner section 3.

Figure 22:
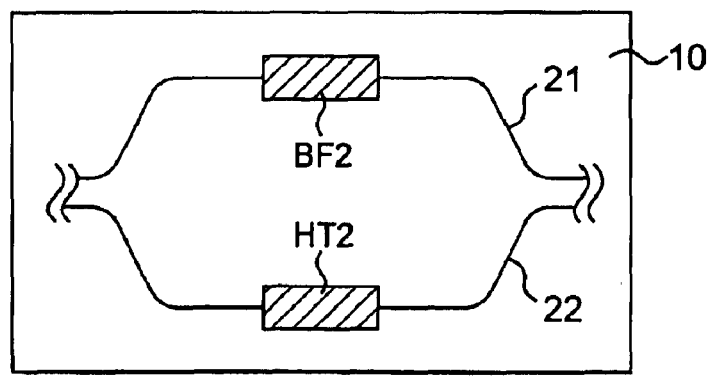
FIG. 22 is a plan view showing a construction of part of a polarization beam combiner section 3 for an optical waveguide type polarization dispersion compensation apparatus according to a sixth modified preferred embodiment of the present invention.
Figure 23:
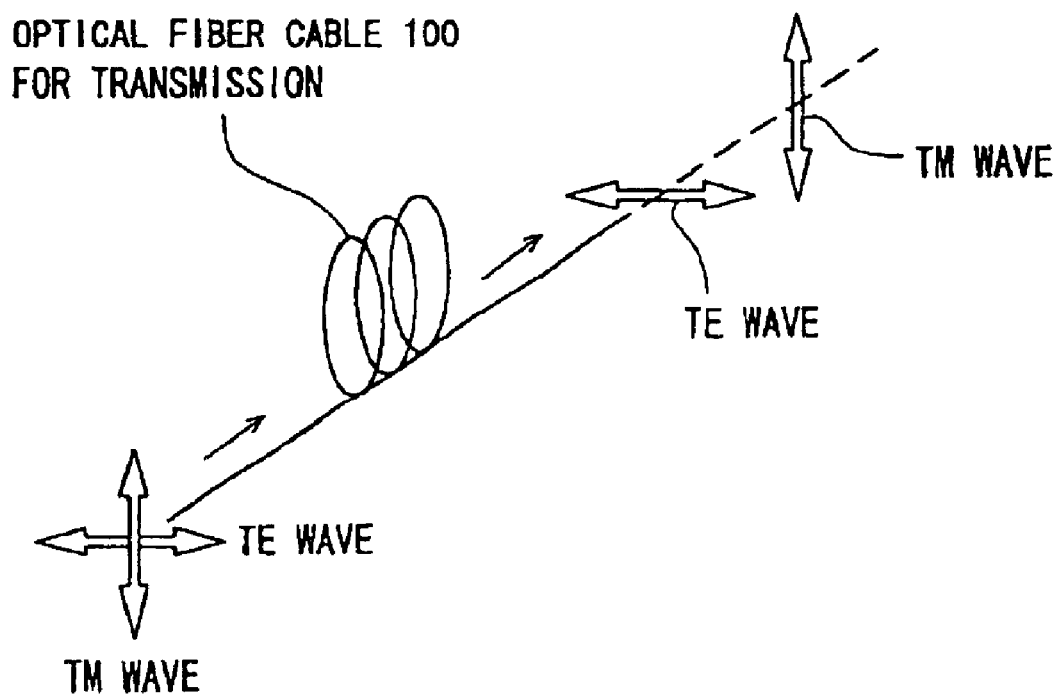
FIG. 23 is a perspective view showing polarization dispersion in an optical fiber cable 100 for transmission according to a prior art.
Figure 24:
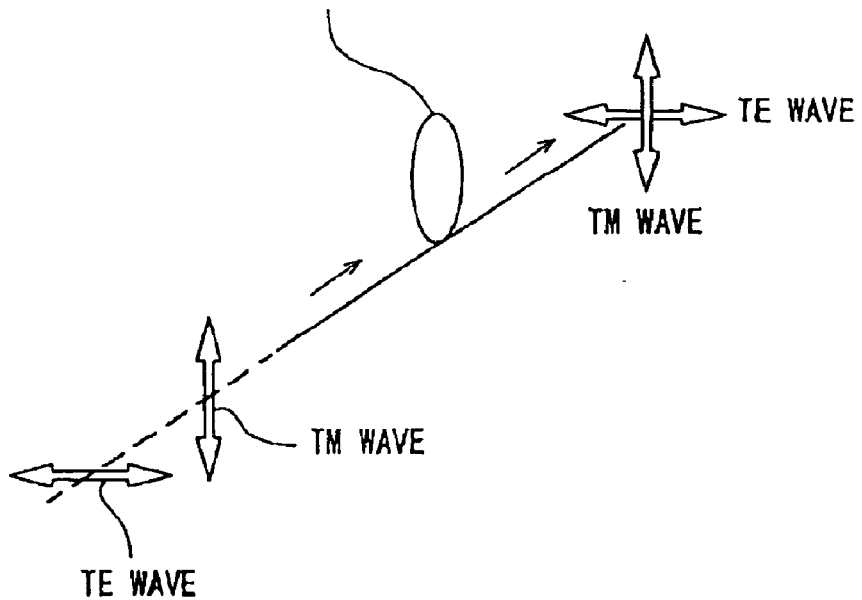
FIG. 24 is a perspective view showing polarization compensation with a polarization-maintaining optical fiber cable 101 according to a prior art.
Figure 25:
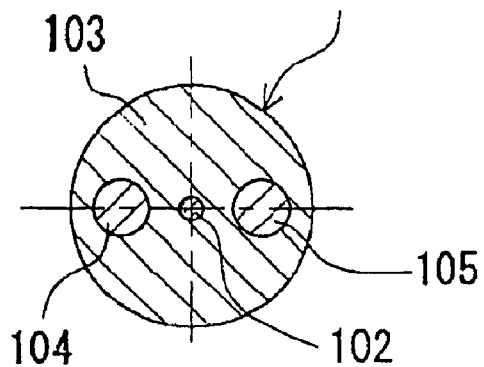
FIG. 25 is a longitudinal sectional view showing a construction of the polarization-maintaining optical fiber cable 101 of FIG. 24.
Figure 26:
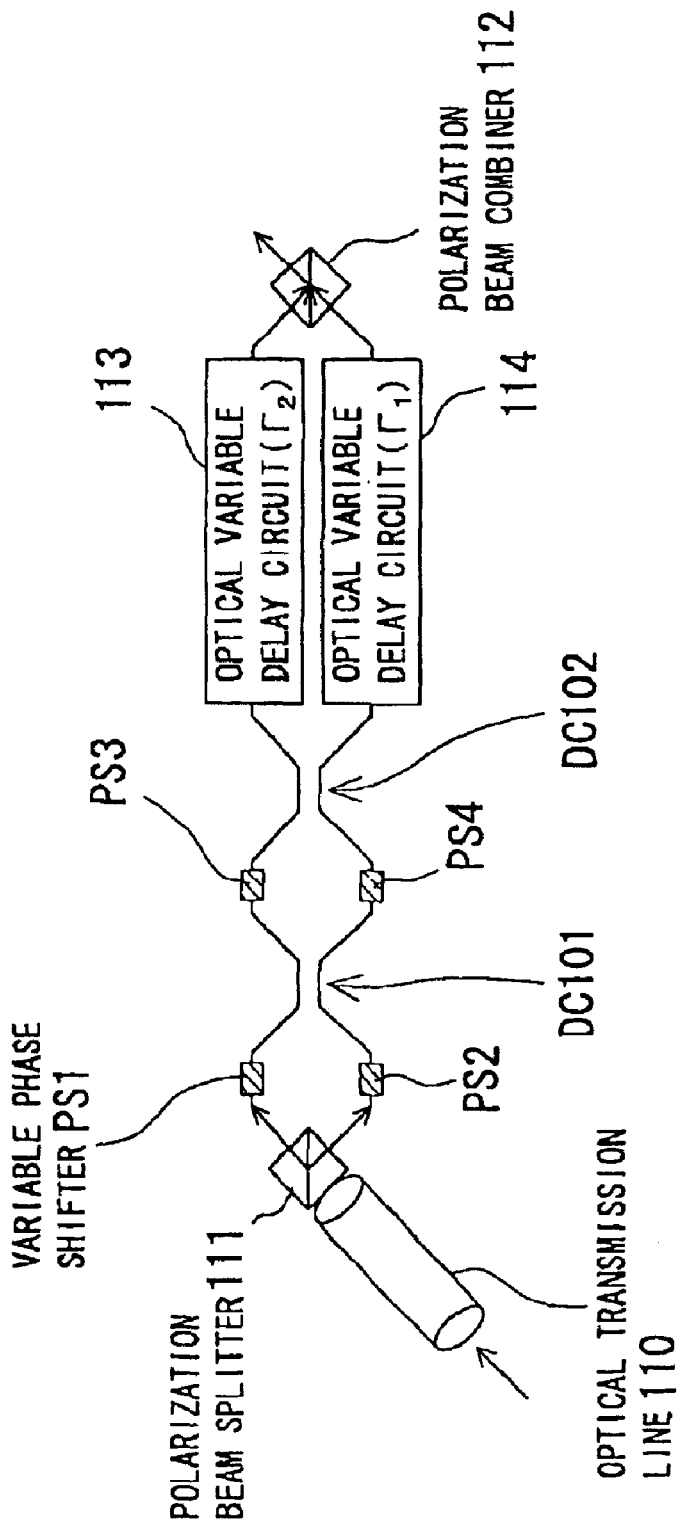
FIG. 26 is a plan view showing a construction of the polarization dispersion compensation apparatus disclosed in a first prior art document.
Figure 27:
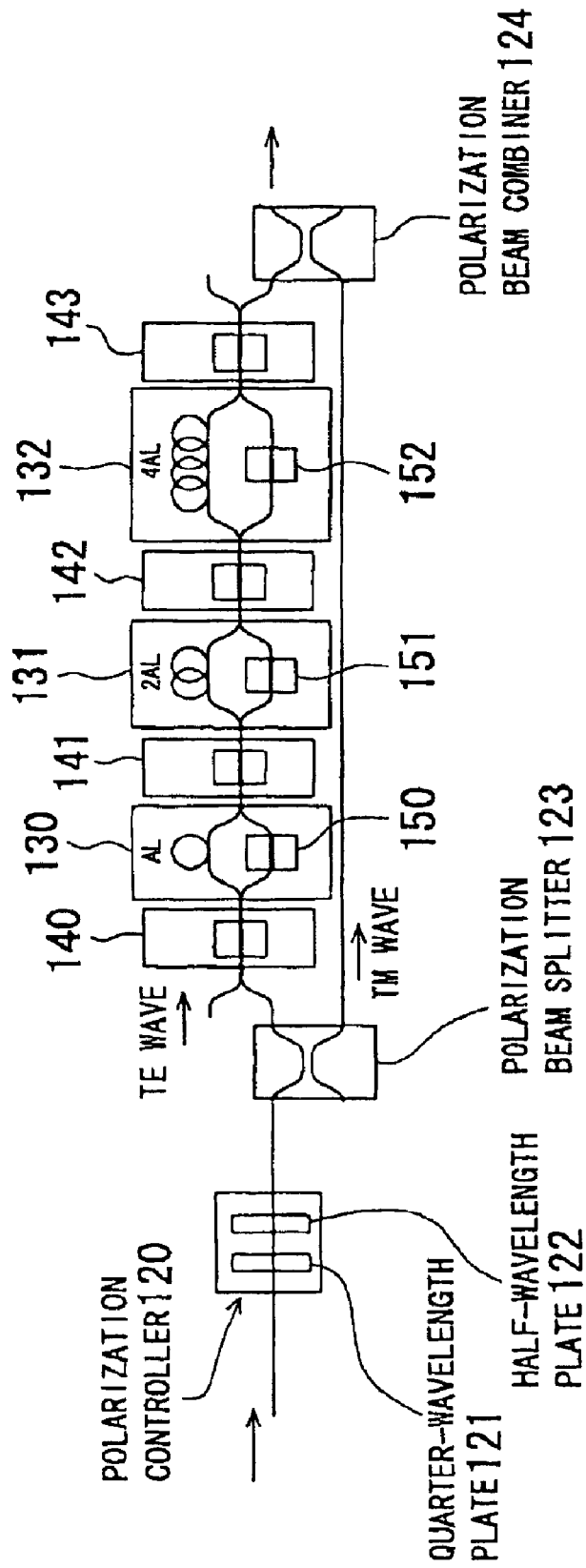
FIG. 27 is a plan view showing a construction of the polarization dispersion compensation apparatus disclosed in a second prior art document.
Figure 28:
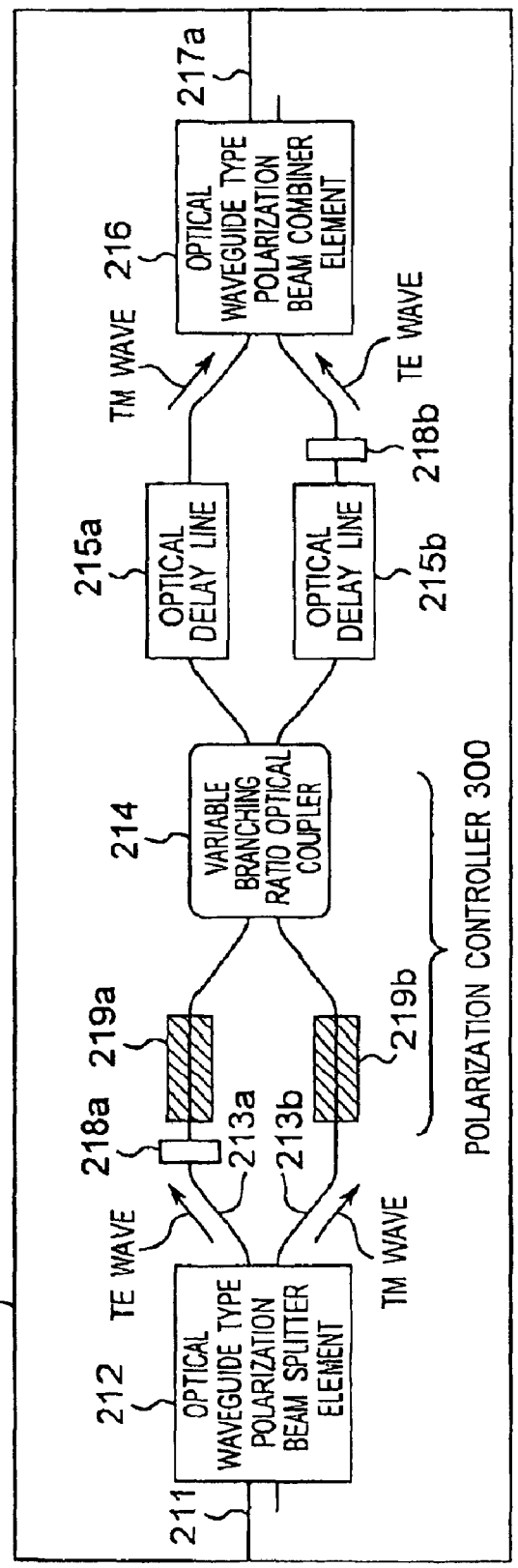
FIG. 28 is a plan view showing a construction of the polarization dispersion compensation apparatus disclosed in a third prior art document.

FIG. 22 is a plan view showing a construction of part of a polarization beam combiner section 3 for an optical waveguide type polarization dispersion compensation apparatus according to the sixth modified preferred embodiment of the present invention. As shown in FIG. 22, it is also acceptable to form the birefringence portion BF2 in one arm portion of the polarization beam combiner section 3 and form the temperature control portion HT2 in the other arm portion.

That is, as shown in FIGS. 17 to 22, in the polarization beam splitter section 1 or the polarization beam combiner section 3, it is acceptable to provide the temperature control portion and the birefringence portion in an identical arm portion or superpose them on each other in an identical arm portion or exchange the positions of the temperature control portion and the birefringence portion.

In the aforementioned preferred embodiments, the birefringence portion is formed on the optical waveguide. However, the optical waveguide formed on the optical waveguide substrate innately has birefringence ascribed to a thermal expansion difference between the optical waveguide substrate and the optical waveguide. Even in the above case, it is acceptable to form a polarization beam splitter section and a polarization beam combiner section by changing the birefringence by means of irradiation with an ArF excimer laser or other means.

INDUSTRIAL APPLICABILITY

As described above in detail, according to one aspect of the present invention, there is provided a polarization dispersion compensation apparatus including:

polarization control means for controlling a polarization state of an inputted optical signal so that a polarization axis of the optical signal substantially coincides with an optical axis of an optical transmission line;

polarization beam splitter means for splitting an optical signal outputted from the polarization control means, and outputting optical signals of two polarized components perpendicular to each other;

optical delay means including two optical transmission lines of lengths different from each other, and causing a difference in delay between the two polarized components of the optical signal outputted from the polarization beam splitter means; and polarization beam combiner means for combining the two polarized components of the optical signal outputted from the optical delay means, and outputting a combined optical signal, wherein the polarization beam splitter means includes a symmetric Mach-Zehnder interferometer having optical transmission lines of first and second arm portions, and at least one of the first and second arm portions includes first refractive index control means for controlling a refractive index of the optical signal propagating through the optical transmission line of the arm portion and first birefringence means for causing birefringence in the optical signal propagating through the optical transmission line of the arm portion, wherein the polarization beam combiner means includes a symmetric Mach-Zehnder interferometer having optical transmission lines of third and fourth arm portions, and at least one of the third and fourth arm portions includes second refractive index control means for controlling a refractive index of the optical signal propagating through the optical transmission line of the arm portion and second birefringence means for causing birefringence in the optical signal propagating through the optical transmission line of the arm portion.

Therefore, the polarization dispersion between the TE wave and the TM wave can be adjusted in accordance with the environmental change of the optical fiber cable for transmission connected at the preceding stage of this polarization dispersion compensation apparatus so as to consistently make compensation by adjusting the first and second refractive index control means in a similar manner. As compared with the prior art example, the elements, which constitute the apparatus, can be downsized and made to have a lower loss with the construction in which the optical transmission lines of the Mach-Zehnder structure that has birefringence in the other arm portion in the polarization beam splitter means and the polarization beam combiner means are employed to execute the refractive index control of the one arm portion. Therefore, according to the present invention, there can be provided a polarization dispersion compensation apparatus, which has a smaller size and a lighter weight than those of the prior art and is able to make compensation for the polarization dispersion with a lower loss. Furthermore, by virtue of removal of the movable portion, deterioration due to aging can be reduced, and reliability can be improved.

Moreover, according to another aspect of the present invention, there is provided a polarization dispersion compensation apparatus including:

polarization control means for controlling a polarization state of an inputted optical signal so that a polarization axis of the optical signal substantially coincides with an optical axis of an optical transmission line;

polarization beam splitter means for splitting an optical signal outputted from the polarization control means, and outputting optical signals of two polarized components perpendicular to each other;

optical delay means including two optical transmission lines of lengths different from each other, and causing a difference in delay between the two polarized components of the optical signal outputted from the polarization beam splitter means; and polarization beam combiner means for combining the two polarized components of an optical signal outputted from the optical delay means, and outputting a resulting combined optical signal, wherein the polarization beam splitter means including a fifth directional coupler having mutually adjacent two optical transmission lines, distributing the inputted optical signal into two optical signals, and outputting the distributed two optical signals, wherein the mutually adjacent two optical transmission lines of the fifth directional coupler includes fourth refractive index control means for controlling a refractive index of optical signals propagating through the two optical transmission lines and third birefringence means for causing birefringence in the optical signals propagating through the two optical transmission lines, wherein the polarization beam combiner means includes a sixth directional coupler having mutually adjacent two optical transmission lines, distributing the inputted optical signal into two optical signals, and outputting the distributed two optical signals, and wherein the mutually adjacent two optical transmission lines of the sixth directional coupler includes fifth refractive index control means for controlling a refractive index of optical signals propagating through the two optical transmission lines and fourth birefringence means for causing birefringence in the optical signals propagating through the two optical transmission lines.

Therefore, the polarization dispersion between the TE wave and the TM wave can be adjusted in accordance with the environmental change of the optical fiber cable for transmission connected at the preceding stage of this polarization dispersion compensation apparatus so as to consistently make compensation by adjusting the first and second refractive index control means in a similar manner. As compared with the prior art example, the elements, which constitute the apparatus, can be downsized and made to have a lower loss with the construction in which the optical transmission lines that have birefringence in the polarization beam splitter means and the polarization beam combiner means are employed to execute the refractive index control. Therefore, according to the present invention, there can be provided a polarization dispersion compensation apparatus, which has a smaller size and a lighter weight than those of the prior art and is able to make compensation for the polarization dispersion with a lower loss. Furthermore, by virtue of removal of the movable portion, deterioration due to aging can be reduced, and reliability can be improved.

Furthermore, according to a further aspect of the present invention, there is provided a polarization dispersion compensation apparatus including:

polarization beam splitter means for splitting and outputting optical signals of two polarized components perpendicular to each other;

polarization control means including phase adjustment means and a variable branching ratio coupler and controlling a polarization state of the optical signal;

a pair of optical delay means for delaying the optical signal after the polarization beam splitting; and polarization beam combiner means having first and second output ports, combining the two polarized components of the optical signal outputted from the optical delay means, and outputting a resulting combined optical signal through the first output port, wherein the polarization beam splitter means and the polarization beam combiner means is of a symmetric Mach-Zehnder interferometer having birefringence at least in one arm portion, and wherein the phase adjustment means and the variable branching ratio coupler is controlled so that a level of a signal outputted from the first output port of the polarization beam combiner means becomes the maximum or so that a level of a signal outputted from the second output port of the polarization beam combiner means becomes the minimum.

The control of compensating polarization dispersion was difficult according to the prior art. However, according to the present invention, the control of compensating polarization dispersion can be remarkably simplified as compared with the prior art.

What is claimed is:

1. A polarization dispersion compensation apparatus comprising:

polarization control means for controlling a polarization state of an optical signal so that a polarization axis of the optical signal substantially coincides with an optical axis of an optical transmission line;

polarization beam splitter means for splitting an optical signal output from said polarization control means, and outputting optical signals having polarized components perpendicular to each other;

optical delay means including two optical transmission lines having lengths different from each other, and causing a difference in delay between the polarized components of the optical signal output from said polarization beam splitter means; and polarization beam combiner means for combining the polarized components of the optical signal output from said optical delay means, and outputting a combined optical signal, wherein said polarization beam splitter means comprises a first symmetric Mach-Zehnder interferometer having optical transmission lines in first and second arm portions, at least one of the first and second arm portions comprising first refractive index control means for controlling refractive index for the optical signal propagating through the optical transmission line of the arm portion and first birefringence means for causing birefringence of the optical signal propagating through the optical transmission line of the arm portion, said polarization beam combiner means comprises a second symmetric Mach-Zehnder interferometer having optical transmission lines in third and fourth arm portions, and at least one of the third and fourth arm portions comprising second refractive index control means for controlling refractive index for the optical signal propagating through the optical transmission line of the arm portion and second birefringence means for causing birefringence in the optical signal propagating through the optical transmission line of the arm portion.

2. The polarization dispersion compensation apparatus according to claim 1, wherein the polarization beam splitter means comprises:
  a first directional coupler for distributing an optical signal output from said polarization control means as two optical signals, and outputting the two optical signals distributed, the optical transmission line of the first arm portion propagating a first one optical signal of the two optical signals distributed by said first directional coupler, and the optical transmission line of the second arm portion propagating a second optical signal of the two optical signals distributed by said first directional coupler; and
  a second directional coupler for combining the optical signal propagating through the optical transmission line of the first arm portion with the optical signal propagating through the optical transmission line of the second arm portion and thereafter distributing a resulting combined optical signal as two optical signals, and outputting the two optical signals distributed; and the polarization beam combiner means comprises:
  a third directional coupler for combining the polarized components of the optical signal, and thereafter distributing a resulting combined optical signal as two optical signals, and outputting the two optical signals distributed, the optical transmission line of the third arm portion propagating a first optical signals of the two optical signals distributed by said third directional coupler, and the optical transmission line of the fourth arm portion propagating a second optical signal of the two optical signals distributed by said third directional coupler; and
  a fourth directional coupler for combining the optical signal propagating through the optical transmission line of the third arm portion with the optical signal propagating through the optical transmission line of the fourth arm portion and thereafter outputting a resulting combined optical signal.

3. The polarization dispersion compensation apparatus according to claim 1, wherein the first refractive index control means controls temperature of the optical transmission line of the arm portion provided with the first refractive index control means, to control the refractive index for the optical signal propagating through the optical transmission line of the arm portion, and the second refractive index control means controls temperature of the optical transmission line of the arm portion provided with the second refractive index control means, to control the refractive index for the optical signal propagating through the optical transmission line of the arm portion.

4. The polarization dispersion compensation apparatus according to claim 1, wherein said first refractive index control means controls an electric field applied to the optical transmission line of an arm portion subjected to a polling process and which includes the first refractive index control means, to control the refractive index for the optical signal propagating through the optical transmission line of the arm portion, and said second refractive index control means controls an electric field applied to the optical transmission line of an arm portion subjected to a polling process and which includes the second refractive index control means, to control the refractive index for the optical signal propagating through the optical transmission line of said arm portion.

5. The polarization dispersion compensation apparatus according to claim 1, wherein said first birefringence means irradiates the optical transmission line of the arm portion including the first birefringence means with ultraviolet light, to cause birefringence in the optical signal propagating through the optical transmission line of the arm portion, and said second birefringence means irradiates the optical transmission link of the arm portion including the second birefringence means with ultraviolet light, to cause birefringence in the optical signal propagating through the optical transmission line of the arm portion.

6. The polarization dispersion compensation apparatus according to claim 1, comprising third refractive index control means for controlling temperature of a first optical transmission line of the two optical transmission lines of the optical delay means, to control the refractive index for the optical signal propagating through the first optical transmission line.

7. The polarization dispersion compensation apparatus according to claim 1, wherein a first optical transmission line of the two optical transmission lines of said optical delay means is subjected to a polling process, and said polarization dispersion compensation apparatus further comprises third refractive index control means for controlling an electric field applied to the first optical transmission line subjected to the polling process, to control the refractive index for the optical signal propagating through the first optical transmission line.

8. The polarization dispersion compensation apparatus according to claim 1, wherein the optical transmission line is an optical waveguide on a substrate.

9. The polarization dispersion compensation apparatus according to claim 1, wherein the optical transmission line is an optical fiber cable.

10. A polarization dispersion compensation apparatus comprising:
  polarization control means for controlling a polarization state of an optical signal so that a polarization axis of the optical signal substantially coincides with an optical axis of an optical transmission line;
  polarization beam splitter means for splitting an optical signal output from said polarization control means, and outputting optical signals having polarized components perpendicular to each other;

optical delay means including two optical transmission lines having lengths different from each other, and causing a difference in delay between the polarized components of the optical signal output from said polarization beam splitter means; and polarization beam combiner means for combining the polarized components of the optical signal output from said optical delay means, and outputting a combined optical signal, wherein the polarization beam splitter means comprises a first directional coupler having, mutually adjacent, two optical transmission lines, distributing the optical signal as two optical signals, and outputting the two optical signals distributed, the mutually adjacent optical transmission lines of said first directional coupler comprise first refractive index control means for controlling refractive index for optical signals propagating through the two optical transmission lines and first birefringence means for causing birefringence in the optical signals propagating through the two optical transmission lines, the polarization beam combiner means comprises a second directional coupler having, mutually adjacent, two optical transmission lines, distributing the optical signal as two optical signals, and outputting the two optical signals distributed, and the two optical transmission lines of the second directional coupler comprises second refractive index control means for controlling refractive index for optical signals propagating through the two optical transmission lines and second birefringence means for causing birefringence in the optical signals propagating through the two optical transmission lines.

* * * * *